United States Patent [19]
Sakayama et al.

[11] Patent Number: 5,907,599
[45] Date of Patent: May 25, 1999

[54] FACSIMILE COMMUNICATION METHOD AND FACSIMILE MACHINE

[75] Inventors: Takashi Sakayama; Yoshihiro Maei; Masahiro Mochizuki; Yoshiaki Tezuka; Hiroaki Sakaki; Hirotaka Kawabata, all of Saitama, Japan

[73] Assignee: Fuji Xerox Co., Ltd., Tokyo, Japan

[21] Appl. No.: 08/604,326

[22] Filed: Feb. 21, 1996

[30] Foreign Application Priority Data

Feb. 22, 1995 [JP] Japan ................................. 7-033580

[51] Int. Cl.$^6$ ................................................ H04M 11/00
[52] U.S. Cl. ..................... 379/100.17; 358/434; 358/438
[58] Field of Search ......................... 379/100.17, 100.01, 379/93.31, 93.32, 93.33, 93.34; 358/434, 435, 436, 437, 438, 439, 468

[56] References Cited

U.S. PATENT DOCUMENTS

| 5,173,786 | 12/1992 | Nakagawa | 358/405 |
| 5,351,134 | 9/1994 | Yaguchi et al. | 358/435 |
| 5,477,340 | 12/1995 | Hasegawa | 358/438 |

FOREIGN PATENT DOCUMENTS

| 61-98064 | 5/1986 | Japan . |
| 62-38660 | 2/1987 | Japan . |
| 3-68262 | 3/1991 | Japan . |
| 3-154566 | 7/1991 | Japan . |
| 3-205958 | 9/1991 | Japan . |
| 5-191613 | 7/1993 | Japan . |
| 5-219334 | 8/1993 | Japan . |

*Primary Examiner*—Stella Woo
*Attorney, Agent, or Firm*—Finnegan, Henderson, Farabow, Garrett & Dunner, L.L.P.

[57] ABSTRACT

In a facsimile communication method, when a home facsimile machine makes the transition to simplified protocol phase B because of sensing polarity inversion, CED reception from an associated machine, etc., it stores 9600 bps as the initial value of control signal communication speed and sends a communication speed notification signal of the frequency corresponding to the stored communication speed to the associated machine, then sends an NSS thereto at the stored communication speed. When receiving the communication speed notification signal, the associated machine previously senses execution of the simplified protocol and the communication speed of the subsequently received NSS from the notification signal and receives the NSS at the sensed communication speed, then sends a communication speed notification signal of the frequency corresponding to the sensed communication speed and subsequently sends an NSF at the communication speed. When receiving the communication speed notification signal, the home machine also previously senses the NSF communication speed from the notification signal and receives the NSF at the sensed communication speed, then makes the transition to phase C.

4 Claims, 18 Drawing Sheets

FACSIMILE COMMUNICATION METHOD AND FACSIMILE MACHINE

BACKGROUND OF THE INVENTION

1. Field of the Invention

This invention relates to a facsimile communication method and a facsimile machine, and in particular to a facsimile communication method and a facsimile machine for shortening the time of a protocol executed before transmission and reception of image information.

2. Description of the Related Art

Conventional facsimile machines execute facsimile communication in accordance with transmission control procedures standardized by ITU-T (old CCITT) Recommendations T.30 as a facsimile protocol on a public switched telephone network. However, in the transmission control procedures, a control signal is transmitted at a low speed of about 300 bps so that a distant office can receive the control signal reliably, and it takes time in protocols in phases A and B executed before transmission and reception of image information (phase C). Thus, hitherto, the following techniques for shortening the protocols in phases A and B have been proposed:

Disclosed in Japanese Patent Unexamined Publication No. Sho. 61-98064 is a technique wherein a polarity inversion detection circuit, a memory circuit for storing the telephone number and function of an associated machine, and a control signal sending circuit for sending a control signal for informing the associated machine of a simplified protocol are provided and to originate a call, the availability of the simplified protocol function of the associated machine is read from the memory circuit and if the associated machine has the simplified protocol function, a control signal (command signal spc) for notifying the associated machine of execution of a nonstandard simplified protocol is sent from the control signal sending circuit just after the polarity inversion detection circuit detects polarity inversion. However, the technique requires additional specific signal sending means for notifying the associated machine of execution of the nonstandard simplified protocol.

Disclosed in Japanese Patent Unexamined Publication No. Sho. 62-38660 is a technique wherein when a calling facsimile machine receives an NSF (nonstandard function identification signal) at 300 bps from a called party, it transmits an NSS (nonstandard function setting signal) at 300 bps, then successively transmits image information, thereby shortening the time of a TCF (training check signal) and a CPR (reception ready confirmation signal). The technique shortens the time of image information transmission as compared with the standard protocol. However, since the NSF and NSS are transmitted and received at 300 bps, it is likely that it will take significant time to transmit and receive the NSF and NSS under present conditions in which the communication function increasingly grows and accordingly the amount of data to be transferred by the NSF and NSS increases more and more, although it depends on the data amount of the NSF and NSS; the technique is inefficient.

In the techniques described in Japanese Patent Unexamined Publication No. Sho. 62-38660, since the calling party sends image information following the NSS, a fallback procedure does not exist; if image information training results in an error in the called party, a NACK signal (negative acknowledge) is sent to the calling party, which then again sends training and image information to the called party. However, since the calling party need not sense the NACK signal in the standard protocol, new means must be added, leading to an increase in costs.

Described in Japanese Patent Unexamined Publication No. Hei. 3-68262 is a technique wherein when a calling party detects a CED (called equipment discrimination signal) from a called party, it sends a tone and upon detection of the tone, the called party stops sending the CED and the calling party measures the CED length and if the measurement value is shorter than the threshold value, sends an NSS at high speed. However, since negotiation of a preprocedure is omitted and the calling and called parties communicate with each other according to communication parameters such as paper size, line density, compression method, etc., predetermined between both the parties, the functions that can be used with the standard protocol by changing the communication parameters cannot be used with the simplified protocol.

In the technique described in Japanese Patent Unexamined Publication No. Hei. 3-68262, the initial value of the communication speed of the NSS and image information transmitted following the NSS is predetermined and each time an error occurs, resending is performed. If the number of times an error has occurred reaches the specified number of times, the communication speed falls back, for example, from 9600 bps to 7200 bps for communication. However, in the technique, the calling party cannot recognize error occurrence in the called party and a mismatch may occur between the number of error occurrence times counted by the calling party and that counted by the called party. In this case, the calling and called parties differ in communication speed and the communication does not hold. Also, specific signal sending means for sending a tone for stopping sending the CED from the called party and notifying the called party of execution of the simplified protocol becomes newly necessary.

Further described in Japanese Patent Unexamined Publication No. Hei. 3-154566 is a technique wherein when polarity inversion is sensed, a 300-bps NSS is sent and if polarity inversion cannot be sensed and a CED is detected, a tone is sent for stopping the CED and a 300-bps NSS is sent. In the technique, the contents of the FIF (facsimile information field) of an NSF of an associated office are stored at the first communication time and at the next communication time and later, the NSF is omitted and communication parameters are determined based on the stored contents. For the image information communication speed, the calling party stores a communication speed history and transmits image information at the stored communication speed.

However, since the technique also transmits the NSS at 300 bps, it is likely that it will take significant time to transmit the NSS as in Japanese Patent Unexamined Publication No. Sho. 62-38660 described above; the technique is inefficient. In the technique, to omit transmission of the NSF from the called party, the calling party needs to store the contents of the FIF of the NSF of the called party at the time of first communication. To store the FIF contents for each associated party, a large-capacity memory is required, leading to an increase in costs.

The communication speed history needs to be stored because of no fallback procedure. To store the communication speed history for each associated party, a still larger capacity memory is required, leading to a further increase in costs. Also, specific signal sending means for sending a tone for stopping sending the CED from the called party and notifying the called party of execution of the simplified protocol needs to be newly provided, as in Japanese Patent Unexamined Publication No. Hei. 3-68262 described above.

Disclosed in Japanese Patent Unexamined Publication No. Hei. 3-205958 is a technique wherein a predetermined communication speed is set in the FIF of an NSF in a called party and the NSF is transmitted at 300 bps and a calling party transmits a fast NSS at the setup communication speed and subsequently also transmits framed image information. However, since the technique transmits the NSF at 300 bps, it is likely that it will take significant time to transmit the NSF as in Japanese Patent Unexamined Publication No. Sho. 62-38660 described above; this technique is also inefficient. Also described in Japanese Patent Unexamined Publication No. Hei. 3-205958 is that communication may be executed at the highest speed among the reception capabilities concerning the communication speed of the called party contained in the NSF or DIS in place of setting the communication speed in the FIF of the NSF. According to the description, when the called party transmits an NSF, next the calling party sends an NSS at high speed. If the highest speed of the calling party is slower than the called party, the called party, which does not contain means for sensing it, cannot sense the speed at which the calling party sends the NSS; there is a high possibility that communication will not hold.

Further in the technique, since the calling party sends image information following the NSS, a fallback procedure does not exist; described in Japanese Patent Unexamined Publication No. Hei. 3-205958 is that if an FCS error (frame check sequence error) occurs in the called party, the called party may send a tone for notifying the error occurrence and the calling party may resend the NSS at high speed. However, since the calling party need not sense such a tone in the standard protocol, new means must be added, leading to an increase in costs.

Further described in Japanese Patent Unexamined Publication No. Hei. 5-191613 is that while a called party sends a CED, a calling party sends a simplified protocol control signal and if the called party, which receives the simplified protocol control signal, stops sending the CED, then the simplified protocol is executed; if the called party does not stop sending the CED, a normal protocol is executed. However, specific signal sending means needs also to be newly provided for sending a simplified protocol control signal for stopping sending the CED and notifying the called party that the simplified protocol can be executed.

Described in Japanese Patent Unexamined Publication No. Hei. 5-219334 is a technique wherein when detecting a DED, the calling party sends a unique tone (DTMF) for also notifying the called party of the communication speed of image information to the called party for causing the called party to stop sending the CED and send a 300-bps NSF for a simplified protocol (NSF from which indispensable capability parameters are omitted). The calling party sends image information parameters at the fast communication speed notified with the unique tone before sending the image information. However, since the technique transmits the NSF at 300 bps, it is likely that it will take significant time to transmit the NSF as in Japanese Patent Unexamined Publication Nos. Sho. 62-38660 and Hei. 3-205958 described above; the technique is not much efficient. It is also necessary to newly provide unique tone sending means for sending the unique tone (DTMF).

Since the image information parameters are sent at high speed before the image information is sent, the information to be sent to the called party with the unique tone DTMF is only the communication speed of image information. However, no fallback procedure exists in the control and considering shortening of the communication time in the fallback procedure, it is necessary to speed up transmission and reception of the control signals such as an NSF. To shorten the communication time of image information, it is effective to apply the maximum communication speed 14.4 kbps defined in ITU-T Recommendations V.17, for example, for transferring the image information. To speed up transmission and reception of commands, the control signals may be transmitted and received at 14.4 kbps matching the above-mentioned image information communication speed.

However, to send the control signals, it is also necessary to send a training signal, etc., as defined in various recommendations. Since V.17 defines the training signal sending time as 1.2 seconds, if control signals are transmitted and received conforming to V.17, the training signal needs to be sent for a comparatively long time and the time required for transmitting and receiving the control signals is not necessarily shortened. Thus, the image information communication speed is not always the optimum communication speed for sending the control signals at high speed.

SUMMARY OF THE INVENTION

It is therefore an object of the invention to provide a facsimile communication method and a facsimile machine capable of shortening the time between the start of transmission and the reception of image information.

To this end, according to one aspect of the invention, there is provided a facsimile communication method comprising the steps of: sending from a calling party to a called party, a calling party communication speed notification signal representing the communication speed of a calling party control signal to be sent from the calling party to the called party; sending from the calling party to the called party, the calling party control signal at the calling party communication speed; receiving the calling party control signal at the called party; sending from the called party to the calling party, a called party communication speed notification signal representing the communication speed of a called party control signal to be sent from the called party to the calling party; and sending from the called party to the calling party, the called party control signal at the called party communication speed.

This method enables the called party to previously sense the control signal communication speed according to the communication speed notification signal. For example, even if the sensed communication speed is a nonstandard value higher than 300 bps, the called party can receive control signals from the calling party. The called party also sends the notification signal representing the control signal communication speed to the calling party as described above, then sends control signals to the calling party at the communication speed.

Therefore, the control signals can be transmitted and received at high speed before image information is transferred; the time to starting of the image information transfer can be furthermore shortened. For example, to change the communication speed because an error occurred, a mismatch between the communication speed recognized at the calling party and that recognized at the called party does not occur.

According to another aspect of the invention, there is provided a facsimile machine comprising means for determining the communication speed of a control signal to be sent to an associated machine; means for sending to the associated machine a communication speed notification signal representing the communication speed determined by the determining means; and means for sending the control signal to the associated machine at the determined communication speed after the communication speed notification signal is sent from the notification signal sending means.

In this facsimile machine, if a control signal is sent at nonstandard high communication speed, the associated machine can previously sense the control signal communication speed and receive the control signal at the communication speed. Therefore, the control signals can be transmitted and received at high speed before image information is transferred; the time to starting the image information transfer can be furthermore shortened.

According to another aspect of the invention, there is provided a facsimile machine comprising: means for receiving a communication speed notification signal representing the communication speed of a control signal sent from an associated machine; means for analyzing the communication speed represented by the received communication speed notification signal; and means for receiving the control signal sent from the associated machine at the communication speed analyzed by the analyzing means.

In this facsimile machine, the control signal communication speed can be previously sensed and even if it is a nonstandard high value, the control signal reception means can receive the control signal sent from the associated machine at the communication speed analyzed by the analysis means.

According to another aspect of the invention, there is provided a facsimile machine comprising: means for determining the communication speed of a control signal to be sent to an associated machine; means for sending to the associated machine a communication speed notification signal representing the communication speed determined by the determining means; means for sending the control signal to the associated machine at the determined communication speed after the communication speed notification signal is sent from the notification signal sending means; means for receiving an associated machine communication speed notification signal representing an associated machine communication speed of an associated machine control signal sent from the associated machine; means for analyzing the associated machine communication speed represented by the received associated machine communication speed notification signal; means for receiving the associated machine control signal sent from the associated machine at the associated machine communication speed analyzed by the analyzing means; and control means for causing the control signal sending means to resend the control signal to the associated machine if the associated machine control signal from the associated machine is not received after the control signal sending means sends the control signal.

In this facsimile machine, even if the communication speed is a nonstandard high value, the control signals can be transmitted and received. Thus, the control signals can be transmitted and received at high speed before image information is transferred; the time to starting the image information transfer can be furthermore shortened.

If the control signal from the associated machine is not received after the control signal sending means sends the control signal, the control means causes the control signal sending means to resend the control signal to the associated machine. If the communication line condition becomes temporarily bad and the transmitted control signal is not received by the associated machine or the control signal sent from the associated machine is not received, the communication does not stop and if the communication line condition recovers to the normal condition, control signal transfer can be restarted.

DETAILED DESCRIPTION OF THE PREFERRED EMBODIMENTS

Referring now to the accompanying drawings, there are shown preferred embodiments of the invention.

First Embodiment

Figure 1:
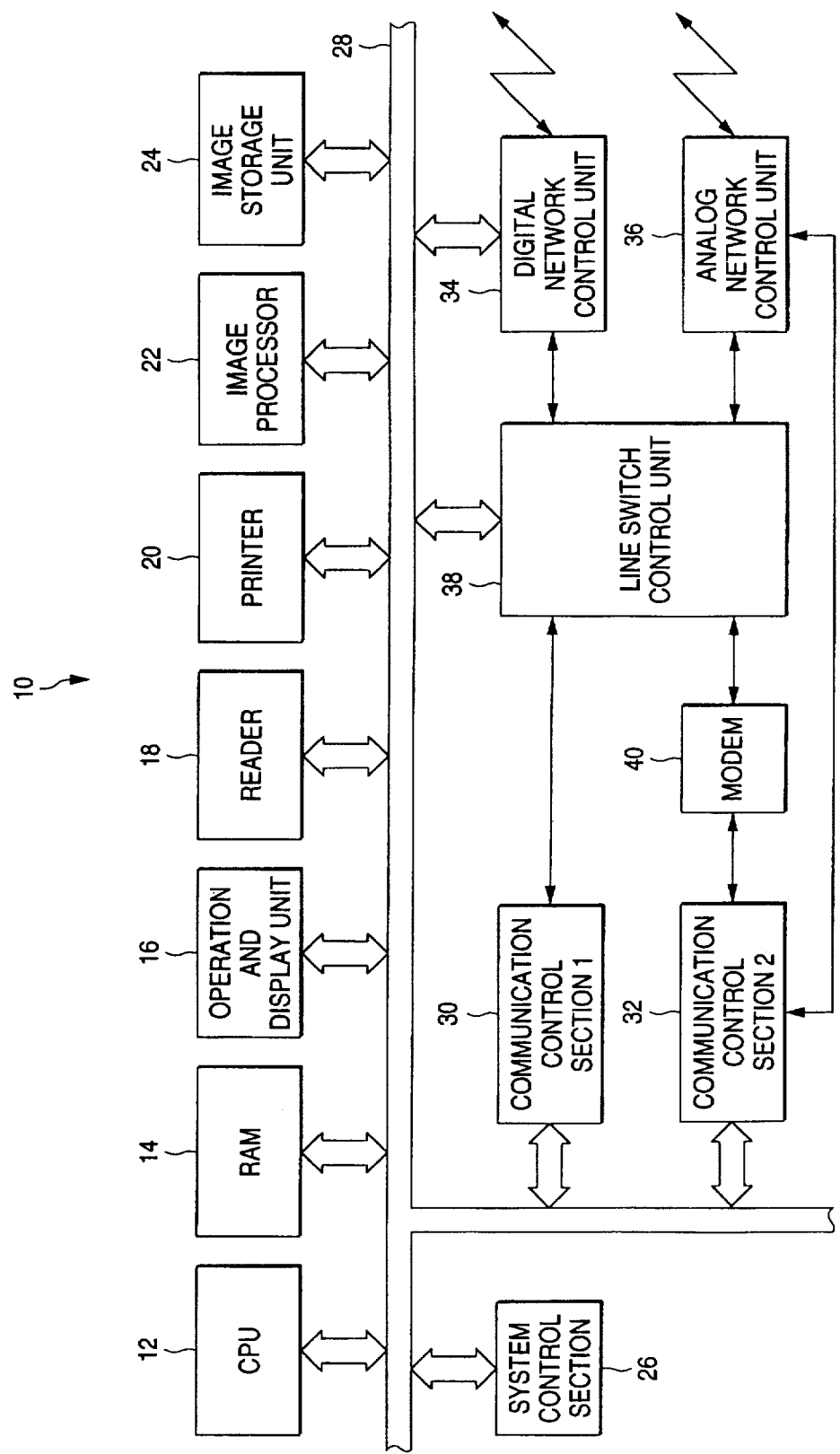
FIG. 1 is a schematic block diagram of a facsimile machine according to a first embodiment of the invention.

FIG. 1 shows the overall configuration of a facsimile machine 10 according to a first embodiment of the invention. The facsimile machine comprises a CPU 12 for governing control of the entire machine, a RAM 14 used as a work area during control program execution, an operation and display unit 16 provided with a display section for displaying various pieces of information and an operation section for entering various commands, data, etc., a reader 18 for reading a transmission document, a printer 20 for printing out reception image information, etc., an image processor 22 for performing image processing such as coding, decoding, enlarging, and reducing, an image storage unit 24 for storing image information to be transmitted or received image information, and a system control section 26 containing a ROM for storing programs executed by the CPU 12. These components are connected to each other by a system bus 28.

The RAM 14 is connected to a backup power supply and serves as a nonvolatile memory whose storage contents can be rewritten. It also stores various pieces of information including an abbreviated telephone number list described below.

Connected to the system bus 28 are a first communication control section 30 for controlling communication, such as G4, appropriate for a digital network, such as an ISDN network, in accordance with a program stored in an internal ROM, a second communication control section 32 for controlling communication, such as G3, appropriate for an analog network, such as a public analog switched phone network, in accordance with a program stored in an internal ROM, a digital network control unit 34 for connecting the facsimile machine to a digital network, and a line switch control unit 38 for switching for connecting outside line interfaces and internal communication circuits. The first communication control section 30 is connected directly to the line switch control unit 38 and the second communication control section 32 is connected to the line switch control unit 38 via a modem (modulator and demodulator) 40 having a low-speed mode and a high-speed mode. The digital network control unit 34 and the analog network control unit 36 are connected to the line switch control unit 38.

The facsimile machine 10 is connected via a line to associated machines such as facsimile machines of the same configuration as the facsimile machine 10, facsimile machines that can be connected only to analog networks, and facsimile machines that can be connected only to digital networks. To connect the facsimile machine 10 only to analog networks, the first communication control section 30 and the digital network control unit 34 can be omitted. To connect the facsimile machine 10 only to digital networks, the second communication control section 32, the modem 40, and the analog network control unit 36 can be omitted.

Next, the operation of the first embodiment will be discussed. To execute communication containing image information transfer with another facsimile machine via an analog network, the facsimile machine 10 has a function of executing communication for transmitting and receiving control signals (commands) at a higher speed than the communication. speed defined in general protocols (300 bps) and omitting a part of the communication sequence defined in general protocols before transferring the image information (the communication will be hereinafter referred to as simplified protocol).

An abbreviated telephone number list representing the correspondence between the telephone numbers and abbreviated numbers of specific associated machines is stored in the RAM 14 of the facsimile machine 10. The list stores information indicating whether or not each registered associated machine has a simplified protocol function and information indicating whether or not it has a polarity inversion function.

At the transmission time, the facsimile machine 10 makes the transition to the simplified protocol mode in any of the following (1)–(3):

(1) When the fact that the associated machine has a simplified protocol reception capability is stored and the is associated machine contains the polarity inversion sensing function, polarity inversion is detected (transmission time transition case 1);

(2) CED is sensed before polarity inversion is detected in transition case (1) or when the fact that the associated machine has a simplified protocol reception capability is stored and the associated machine does not contain the polarity inversion sensing function, CED is detected while CNG (calling tone) is being sent (transmission time transition case 2); and (3) When the fact that the associated machine has no simplified protocol reception capability is stored and GED or a command (control signal) is detected while CNG is being sent, it is judged that the associated machine has the simplified protocol reception capability from the NSF received from the associated machine manufactured by the same manufacturer as the home machine (transmission time transition case 3).

At the reception time, the facsimile machine 10 makes the transition to the simplified protocol mode in any of the following (1)–(3):

(1) A communication speed notification signal for giving an instruction of the transition to the simplified protocol mode and notifying the communication speed is received by the time CED is sent after an incoming call (reception time transition case 1);

(2) While CED is being sent with the communication speed notification signal unreceived after an incoming call, the communication speed notification signal is received and the CED sending is stopped (reception time transition case 2); and (3) While CED is being sent with the communication speed notification signal unreceived after an incoming call, whether the communication speed notification signal is received is checked, but it is not received and the CED sending is stopped. Then, NSF and DIS (CSI if necessary) indicating that the simplified protocol reception capability is contained are sent to the associated machine and the communication speed notification signal is received from the associated machine (reception time transition case 3).

Next, the simplified protocol will be discussed in detail with reference to FIGS. 2–10. First, transmission protocol control processing executed at transmission time will be discussed with reference to FIGS. 2–6.

Figure 2:
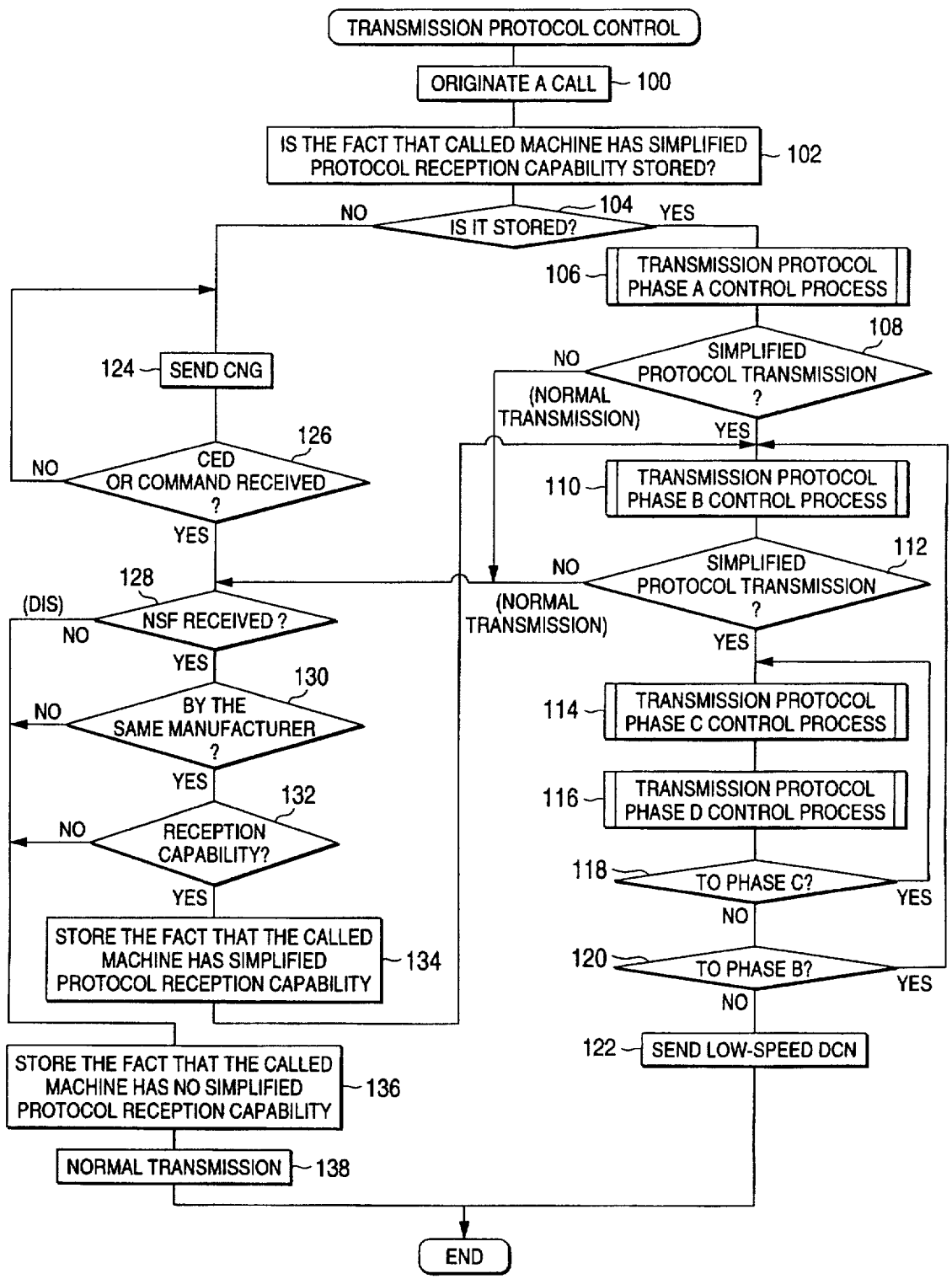
FIG. 2 is a flowchart showing transmission protocol control processing.

At step 100 in FIG. 2, the corresponding telephone number registered in the abbreviated telephone number list is read and a call is originated in response to an abbreviated number entered through the operation and display unit 16. At steps 102 and 104, whether or not the fact that the called machine (station) has the simplified protocol reception capability is stored in the abbreviated telephone number list is determined. If the fact is stored, a transmission protocol phase A control process (FIG. 3) described below is executed at step 106.

At the next step 108, whether or not transmission is to be executed in the simplified protocol mode is determined. If it is not to be executed in the mode, namely, is to be executed in the normal transmission mode, control advances to step 129. If transmission is to be executed in the simplified protocol mode, a transmission protocol phase B control process (FIG. 4) described below is executed at step 110, and whether or not transmission is to be executed in the simplified protocol mode is determined at step 112. If it is to be executed in the normal transmission mode, control advances to step 128. If it is to be executed in the simplified protocol mode, a transmission protocol phase C control process (FIG. 5) described below is executed at step 114 and a transmission protocol phase D control process (FIG. 6) described below is executed at step 116.

At step 118, whether or not the transition to phase C is to be made is determined. If it is to be made, control returns to step 114. If it is not to be made, control goes to step 120 at which whether or not the transition to phase B is to be made is determined. If it is to be made, control goes to step 110. If it is not to be made, namely, the transition to phase E is determined to be made, a low-speed DCN (switch command signal) is sent at step 122 and the transmission is terminated.

On the other hand, at step 104, if the fact that the called machine (station) has the simplified protocol reception capability is not stored, while a CNG is being sent at step 124, whether or not a CED or command has been received is determined at step 126. If it has been received, whether or not an NSF has been received is determined at step 128. If the NSF has been received, whether or not it is an NSF from a facsimile machine manufactured by the same manufacturer as the home facsimile machine (calling station) is determined at step 130. If it is an NSF from a facsimile machine of the same manufacturer as the home facsimile machine, whether or not the called facsimile machine has the simplified protocol reception capability is determined at step 132 based on the data set in a predetermined field of the received NSF.

If the called machine has the simplified protocol reception capability, the fact that it has the simplified protocol reception capability is registered in the corresponding entry of the abbreviated telephone number list at step 134, then control goes to step 110 for making the transition to the simplified protocol mode. The transition to the simplified protocol mode after the fact that the called machine has the simplified protocol reception capability is stored corresponds to transmission time transition case 3 (see FIG. 13). If reception of no NSF is determined at step 128, namely, a DIS (digital identification signal) has been received or if NO is determined at step 130 or 132, the fact that the called machine has no simplified protocol reception capability is registered in the corresponding entry of the abbreviated telephone number list at step 136, then the transition is made to the normal transmission mode at step 138.

Figure 3:
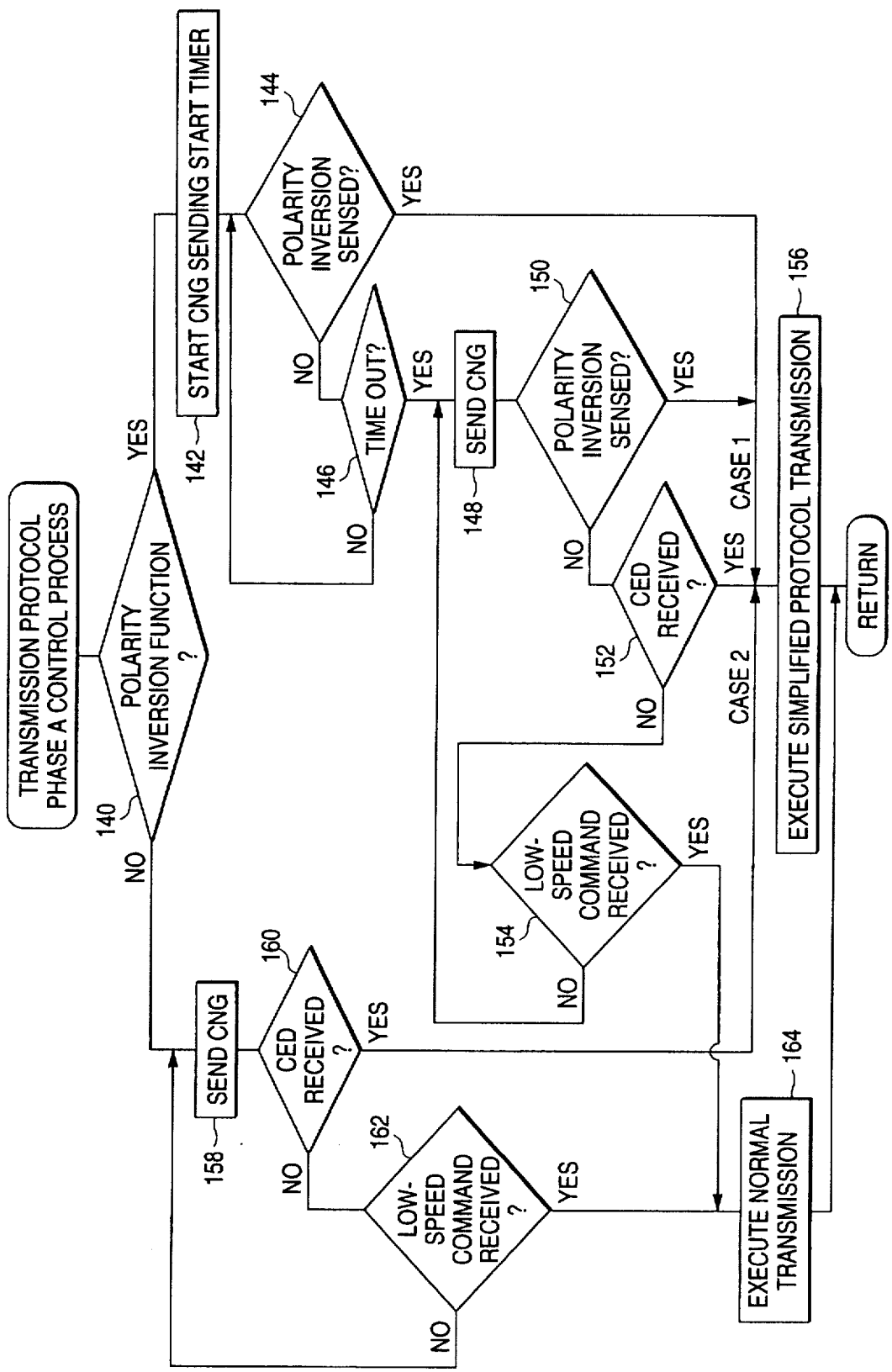
FIG. 3 is a flowchart showing a transmission protocol phase A control process.

Next, the transmission protocol phase A control process will be discussed with reference to FIG. 3. At step 140, whether or not the called machine has a polarity inversion function is determined by referencing the abbreviated telephone number list. If it has the function, a CNG sending start timer is started at step 142 and whether or not polarity inversion has been sensed is determined at step 144. If it has not been sensed, the determination at step 144 is repeated until a timeout is determined to occur at step 146. If polarity inversion has been sensed, control goes to step 156 at which information indicating execution of the simplified protocol mode is stored in the memory and the process is terminated, whereby the transition to the simplified protocol mode is made as described below.

On the other hand, if the CNG sending start timer times out at step 146, a CNG is sent at step 148 and whether or not polarity inversion has been sensed is determined at step 150. If it has not been sensed at step 150, whether or not a CED has been received is determined at step 152. If it has not been received at step 152, whether or not a low-speed command has been received is determined at step 154. If it has not been received either, control returns to step 148. Therefore, the CND sending is continued until YES is determined at any of steps 150–154.

If polarity inversion has been sensed at step 150, control goes to step 156 and the transition is made to the simplified protocol mode. The transition to the simplified protocol mode when polarity inversion has been sensed at step 144 or 150 corresponds to transmission time transition case 1 (see FIG. 11). If a CED has been received at step 152, control goes to stop 156 at which the transition is made to the simplified protocol mode. If a low-speed command has been received at step 154, information indicating execution of the simplified protocol mode is stored in the memory at step 164 and the process is terminated, whereby the transition to the normal transmission mode is made.

If the called machine is determined to have no polarity inversion function at step 140, a CNG is sent at step 158 and whether or not a CED has been received is determined at step 160. If it has not been received at step 160, whether or not a low-speed command has been received is determined at step 162. If it has not been received at step 162, control returns to step 152. Therefore, the CND sending is continued until YES is determined at step 160 or 162.

If a CED has been received at step 160, control goes to step 156 at which the transition is made to the simplified protocol mode. The transition to the simplified protocol mode when the CED has been received at step 152 or 160 corresponds to transmission time transition case 2 (see FIG. 12). If a low-speed command has been received at step 162, the transition to the normal transmission mode is made at step 164.

Next, the transmission protocol phase B control process will be discussed with reference to FIG. 4. At step 400, the initial value of the communication speed of control signals (commands), 9600 bps, is stored in a predetermined area of the RAM 14, which will be hereinafter referred to as the communication speed storage area, and the value of a fallback counter is set to 0. In the first embodiment, the control signal communication speeds, the priorities of the communication speeds, and the frequencies of communication speed notification signal (described below) for respective communication speeds are defined as listed in Table 1.

TABLE 1

| Priority | Communication Speed (bps) | Frequency of Communication Speed Notification Signal (Hz) |
|---|---|---|
| 1 (initial value) | 9600 | 2300 |
| 2 | 7200 | 2400 |
| 3 | 4800 | 2500 |
| 4 | 2400 | 2600 |

Step 400 exemplifies to the determination means according to the invention.

At the next step 402, whether or not polling is to be executed is determined. If polling is not to be executed, the communication speed notification signal of the frequency corresponding to the communication speed stored in the communication speed storage area is sent at step 404. (The initial value is 2300 Hz corresponding to 9600 bps.) The called machine, which receives the communication speed notification signal, makes the transition to the simplified protocol mode as described below.

At step 406, an NSS exemplifies a control signal according to the invention is sent at the communication speed stored in the communication speed storage area, namely, at nonstandard high speed after a lapse of a predetermined time since the communication speed notification signal was sent, and a response wait timer is started. As described above, the initial value of the communication speed is 9600 bps and to use the communication speed 9600 bps, communication is executed in accordance with ITU-T Recommendations V.20, so that the training signal sending time is very short and the called machine receives the NSS in a very short time. At the next step 408, the fallback counter is counted up and at step 410, whether or not a response from the called machine has been received is determined.

When a response has been received, whether or not it is a communication speed notification signal is determined at step 412. If it is a communication speed notification signal, at step 414, the communication speed represented by the received communication speed notification signal is analyzed based on the frequency of the communication speed notification signal (for example, if the frequency is 2300 Hz, the communication speed is determined to be 9600 bps), the analyzed communication speed is stored in the communication speed storage area, and an NSF sent following the communication speed notification signal from the called machine is received at the analyzed communication speed. At the next step 416, information indicating execution of the simplified protocol mode is stored in the memory and the process is terminated.

On the other hand, for example, when the facsimile machine at the receiving party has been changed from a machine having the simplified protocol execution function to one not having the function, if the communication speed notification signal is sent at step 404, the called machine does not make the transition to the simplified protocol mode and CED/DIS, etc., sent at low speed (300 bps) from the called machine is received. In this case, No is determined at step 412, information indicating execution of the normal transmission mode is stored in the memory at step 418, and the process is terminated.

By the way, if the called machine contains the polarity inversion function, whether or not polarity inversion has been sensed is also determined at step 420 while a wait is made for receiving a response. For example, if the communication line condition is bad and the previously sent NSS does not arrive at the called machine or a response sent from the called machine does not arrive at the home facsimile machine (calling station), polarity inversion is not sensed and the response wait timer times out; NO is determined at steps 410 and 420. The fallback counter is checked for count value at step 422 and whether or not the count reaches 2 is determined at step 424. If it does not reach 2, control returns to step 404.

At this time, the communication speed stored in the communication speed storage area is not rewritten, thus the communication speed notification signal of the frequency corresponding to the same communication speed as that at the preceding time is resent at step 404 and NSS is resent at the same communication speed as that at the preceding time at step 406. These steps exemplify the control means according to claim 4. As the fallback counter is counted up at step 408, the fallback counter value reaches 2 and again the response wait state is entered. Therefore, if the communication line condition temporarily worsens and normal communication cannot be executed, communication does not stop. The fallback counter value represents the number of times an NSS has been sent at a predetermined communication speed.

If polarity inversion is not sensed because of continuation of the bad communication condition and the response wait timer times out, YES is determined at step 424 and control goes to step 426 at which the next communication speed slower than the communication speed stored in the communication speed storage area (for example, 7200 bps if the preceding communication speed is 9600 bps: See Table 1) is stored in the communication speed storage area and the fallback counter value is reset to 0. Then, control returns to step 404. Thus, the communication speed notification signal of the frequency corresponding to the communication speed stored in the communication speed storage area slower than that at the preceding time (for example, the frequency is 2400 Hz if the communication speed is 7200 bps) is resent at step 404, and NSS is resent at the communication speed slower than that at the preceding time at step 406.

Since the loop is made in which when the number of NSS sending times indicated by the fallback counter value reaches a predetermined number of times (in this case, twice), the communication speed is lowered and the communication speed notification signal and NSS are resent, the possibility that the called machine can receive the NSS normally becomes high as compared with the case where the NSS is repeatedly sent at a constant communication speed.

If the called machine has the polarity inversion function and polarity inversion has been sensed while a wait is made for receiving a response, YES is determined at step 420 and control goes to step 428 at which the communication speed is reset to the initial value (in the embodiment, 9600 bps), the reset communication speed is stored in the communication speed storage area, and the fallback counter value is reset to 0. Then, the control returns to step 404. Thus, if polarity inversion occurs after a lapse of some time since the line to the called machine was connected and the communication speed has been lowered at the point in polarity inversion occurrence time, the communication speed is restored to the initial value and the communication speed notification signal and NSS are resent at steps 404 and 406. Therefore, as in the abovementioned case, the NSS is also sent at the highest communication speed matching the line condition.

On the other hand, if polling is executed, an NSC (nonstandard function command signal) is sent at step 430 and later in a similar sequence to that described above. That is, the communication speed notification signal of the frequency corresponding to the communication speed stored in the communication speed storage area is sent at step 430. At the next step 432, an NSC is sent at the communication speed stored in the communication speed storage area (nonstandard high speed) and the response wait timer is started. At step 434, the fallback counter is counted up and at step 436, whether or not a response from the called machine has been received is determined. The NSC also corresponds to a control signal of the invention.

If the called machine contains the polarity inversion function, whether or not polarity inversion has been sensed is also determined at step 444 while a wait is made for receiving a response. If polarity inversion is not sensed and the response wait timer times out, the fallback counter is checked for count value at step 446 and whether or not the count reaches 2 is determined at step 448. If it does not reach 2, control returns to step 430. If the count reaches 2, the next communication speed slower than the communication speed stored in the communication speed storage area is stored in the communication speed storage area and the fallback counter value is reset to 0 at step 450. Then, control returns to step 430.

Thus, while no response is received, the NSC is repeatedly resent at a constant communication speed and when the fallback counter value reaches 2, the NSC communication speed is lowered, whereby if the communication line condition is bad, communication does not stop and the NSC is sent to the called machine at an appropriate communication speed matching the line condition. If polarity inversion has been sensed while a wait is made for receiving a response, the communication speed is reset to the initial value, the reset communication speed is stored in the communication speed storage area, and the fallback counter value is reset to 0 at step 452. Then, the control returns to step 430. Thus, if polarity inversion occurs after a lapse of some time since the line to the called machine was connected, the NSC is also sent at the highest communication speed matching the line condition.

When a response has been received from the called machine at step 436, whether or not it is a communication speed notification signal is determined at step 438. If it is a communication speed notification signal, at step 440, the communication speed represented by the received communication speed notification signal is analyzed based on the frequency of the communication speed notification signal, the analyzed communication speed is stored in the communication speed storage area, and an NSS sent following the communication speed notification signal from the called machine is received at the analyzed communication speed, then control jumps to step 468 of the reception protocol phase B control process (see FIG. 8) and NSCF is sent. If NSF, DIS, etc., sent at low speed (300 bps) from the called machine has been received at step 438, control goes to step 442 at which information indicating execution of the normal transmission mode is stored in the memory and the process is terminated.

Figure 5:
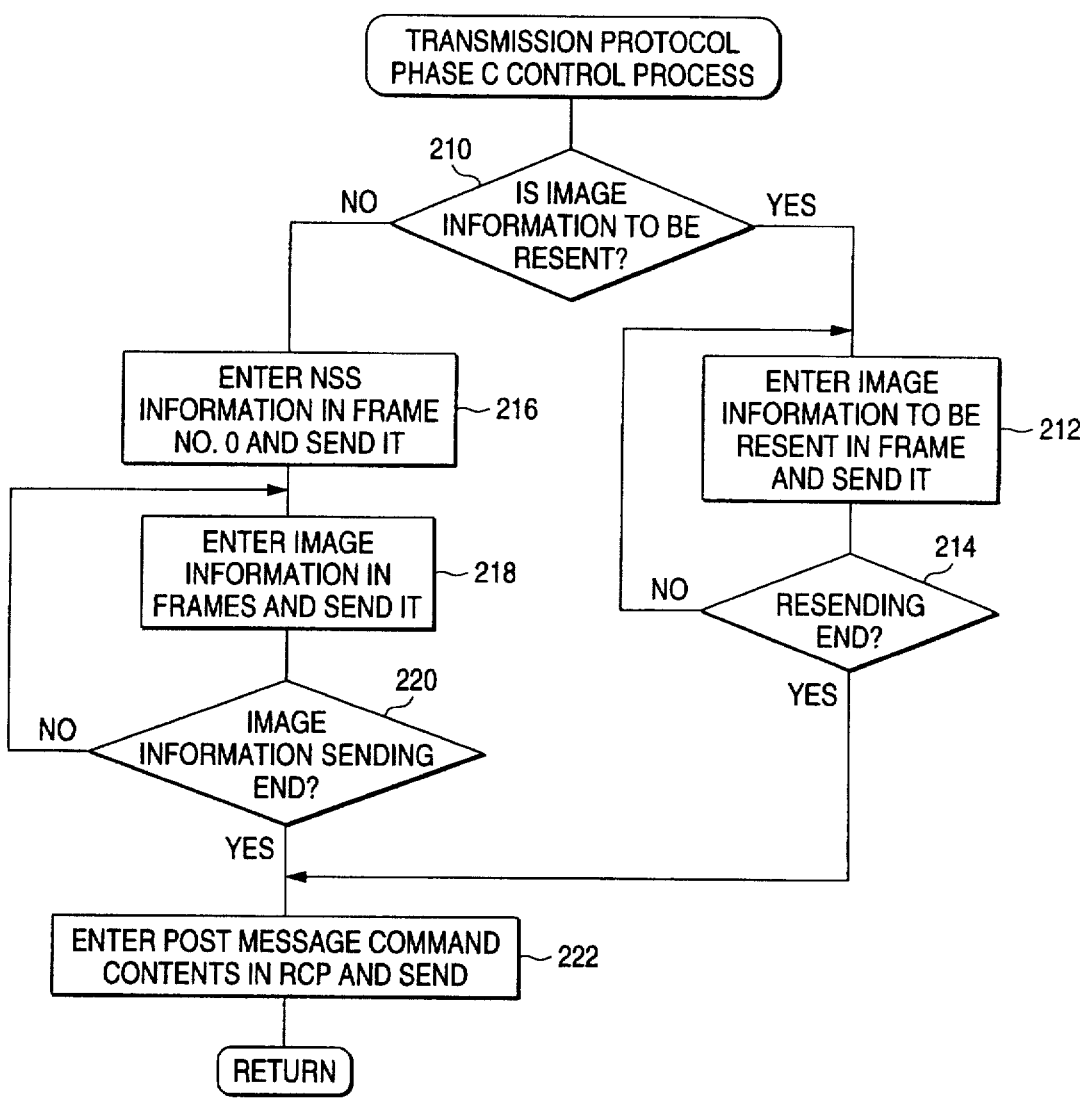
FIG. 5 is a flowchart showing a transmission protocol phase C control process.

Next, the transmission protocol phase C control process will be discussed with reference to FIG. 5. In transmission protocol phase C, image information is divided into frames according to ECM (error correction function, G3 optional function) and image information is set in the second frame with frame No.1 and later (for example, image information of a part of one page is set in one frame) and is sent at high speed such as the maximum communication speed 14.4 kbps defined in V.17, for example.

At step 210, whether or not image information is to be resent is determined. If it is to be resent, the image information to be resent is set in a frame at step 212. If the resending end is determined at step 214, control advances to step 222. If image information is not to be resent, information of NSS previously sent is set in the first frame of frame No.0 and sent at step 216. In this case, the information set in the frame No.0 may be information of NSS previously sent or parameters indicating the image information set in the second frame and later. At step 218, the image information is set in the second frame and later sent. If the image information sending end is determined at step 220, control advances to step 222 at which an RCP (partial page control return signal) with the post message command contents set in the facsimile information field is sent and the process is terminated.

Figure 6:
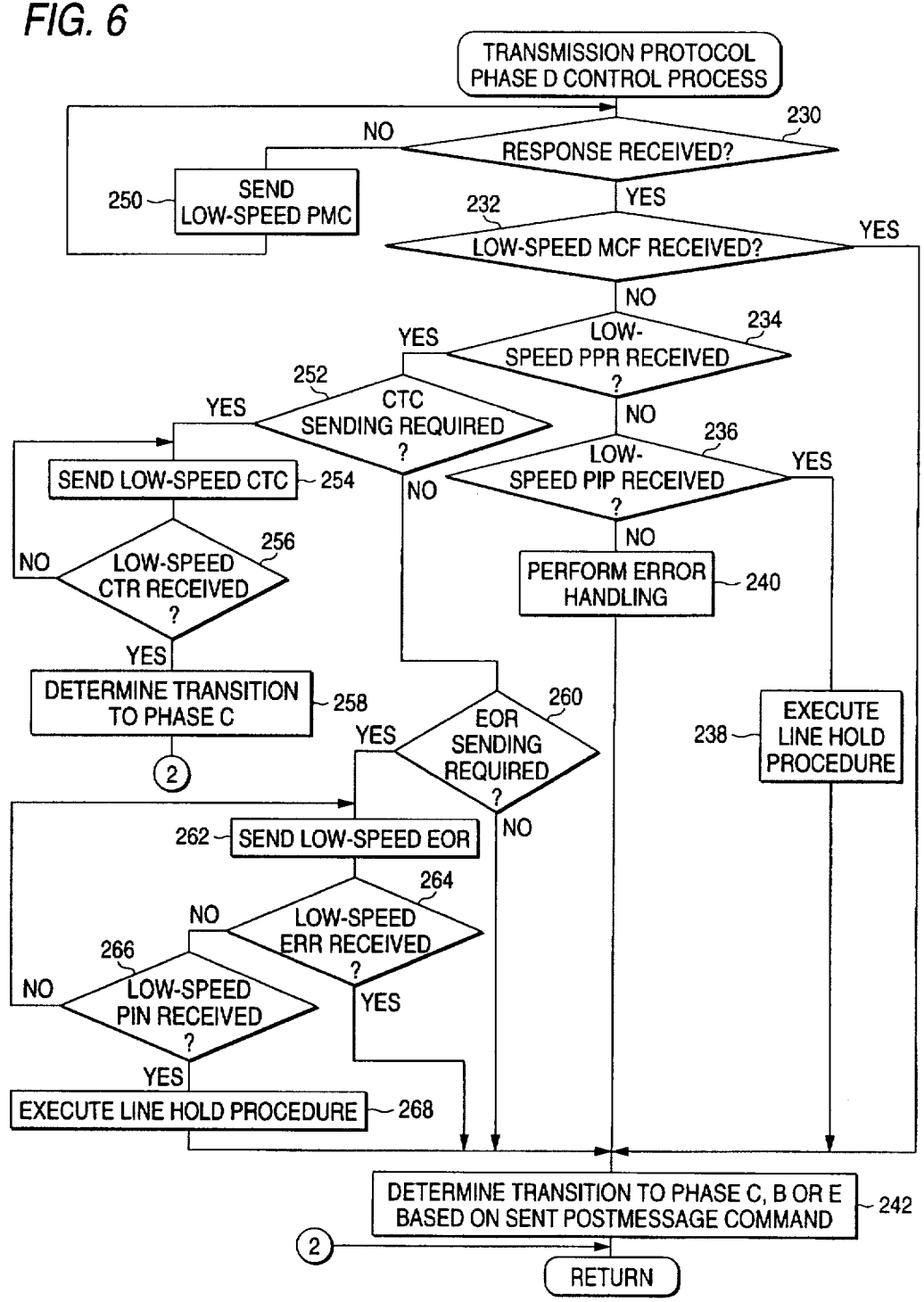
FIG. 6 is a flowchart showing a transmission protocol phase D control process.

Next, the transmission protocol phase D control process will be discussed with reference to FIG. 6. At step 230, whether or not a response has been received from the called machine is determined. If it has been received, whether or not the received response is a low-speed MCF (message confirmation signal) is determined at step 232. If no response is received, a PMC (postmessage command, for example, a postmessage instruction such as PPS.Q or PPS.PriQ) is sent at low speed at step 250 until a response is received.

If a response is received from the called machine and is determined to be a low-speed MCF at step 232, which of transmission phases C, B, and E the transition is to be made to is determined at step 242 based on the postmessage command contents set in the RCP and sent, and the determination result is stored. The determinations at steps 118 and 120 in FIG. 2 are made according to the determination result. If the received response is not a low-speed MCF at step 232, whether or not it is a low-speed PPR (partial page request) is determined at step 234. If it is not a low-speed PPR, whether or not the received response is a low-speed PIP (protocol interruption positive signal) is determined at step 236.

If it is a low-speed PIP at step 236, a line hold procedure is executed at step 238, then control advances to step 242. If the received response is not a low-speed PIP, error handling is performed at step 240, then control advances to step 242. If the received response is a low-speed PPR at step 234, control goes to step 252 at which whether or not sending a CTC (correction continuation) is required is determined. If CTC sending is determined to be required, the CTC is sent at low speed at step 254 until it is determined at step 256 that a low-speed CTR (correction continuation response) has been received. If the CTR has been received, the transition to phase C is determined at step 258 and the process is terminated.

If it is determined at step 252 that CTC sending is not required, whether or not sending an EOR (end of resending) is required is determined at step 260. If it is determined that EOR sending is not required, control goes to step 242. If EOR sending is determined to be required, an EOR is sent at low speed at step 262, then whether or not a low-speed ERR (end-of-resending response) has been received is determined at step 264. If it has been received, control goes to step 242. If the ERR is not received, control goes to step 266 at which whether or not a low-speed PIN (protocol interruption negative signal) has been received is determined. If it has been received, the line hold procedure is executed at step 268, then control goes to step 242.

Next, reception protocol control processing will be discussed with reference to FIGS. 7–10. If it is determined at step 270 in FIG. 7 that an incoming call has been received, a 1.8-second timer is started at step 272 and whether or not a communication speed notification signal has been received is determined at step 274. If the notification signal is not received, whether or not a CNG has been received from the called machine is determined at step 288. If it is not received, whether or not the timer has timed out is determined at step 290. If the timer does not time out either, control returns to step 274, and a loop of steps 274, 288, and 290 is executed until a communication speed notification signal or CNG is received or the timer times out.

If it is determined at step 274 that a communication speed notification signal has been received, the transition is made to the simplified protocol mode (reception time transition case 1) and a reception protocol phase B control process is executed at step 276. If it is not determined at the next step 278 that an error has occurred, subsequently a reception protocol phase C control process is executed at step 280 and a reception protocol phase D control process is executed at step 282. If the transition to phase C is determined at step 284, control returns to step 280 at which again the reception protocol phase C control process is executed. If the transition to phase B is determined at step 286, control returns to step 276 at which again the reception protocol phase B control process is executed. After execution of reception phases B, C, D, E, a low-speed DCN (disconnection command signal) is received at step 289 and the process is terminated.

If a CNG is received or the timer times out, a CED is sent at step 292 and whether or not a communication speed notification signal has been received is determined at step 294. If the notification signal has been received, the CED sending is stopped at step 296, then the transition is made to the simplified protocol mode (reception time transition case 2) and control goes to step 276. If the notification signal is not received, whether or not the CED sending is to be terminated is determined at step 298 based on the CED sending time. If it is determined that the CED sending is not to be terminated, control returns to step 292 and the CED sending is continued. If the CED sending is determined to be terminated, NSF/DIS is sent at step 300, then whether or not a communication speed notification signal has been received is determined at step 302. If the notification signal has been received, the transition is made to the simplified protocol mode (reception time transition case 3) and control goes to step 276. If the notification signal is not received, the transition is made to the normal reception mode at step 304.

Next, the reception protocol phase B control process will be discussed with reference to FIG. 8. When the process is executed, a communication speed notification signal is already received from the calling machine, as seen from the description made so far. At step 460, the communication speed represented by the received communication speed notification signal is analyzed, the analyzed communication speed is stored in the communication speed storage area, and reception of a control signal sent following the communication speed notification signal from the calling machine is started at the analyzed communication speed. This sequence starting at the reception of the communication speed notification signal corresponds to notification signal reception means, analysis means, and control signal reception means of the invention.

At the next step 462, whether or not the received control signal is a high-speed NSS is determined. If it is a high-speed NSS, a communication speed notification signal of the frequency corresponding to the communication speed stored in the communication speed storage area is sent to the calling machine at step 464 and subsequently an NSF as a control signal of the invention is sent at the communication speed stored in the communication speed storage area (the same as the communication speed of the previously received NSS) at step 466. When the NSF is sent, the transition is made to reception protocol phase C. At the next step 468, whether or not a communication speed notification signal has been received is determined by the time the transition to phase C is made. If the notification signal has been received, it means that the previously sent NSF has not arrived at the calling machine and NSS has been resent therefrom. Then, control returns to step 460. NSS reception and NSF resending are performed at steps 460–468.

By the way, if it is not determined at step 462 that the received control signal is an NSS, whether or not the received control signal is a high-speed NSC is determined at step 470. If it is not a high-speed NSC, a wait is made until a new communication speed notification signal is received at step 472. If a new communication speed notification signal is received, control returns to step 460. If the received control signal is a high-speed NSC at step 470, polling is to be executed. At the next step 474, whether or not polling is enabled is determined. If polling is enabled, control jumps to step 404 of the transmission protocol phase B control process (see FIG. 4) and an NSS is transmitted. If polling is not enabled, an error is set at step 476 and the process is terminated. In this case, the determination at step 278 in FIG. 7 results in YES.

Figure 9:
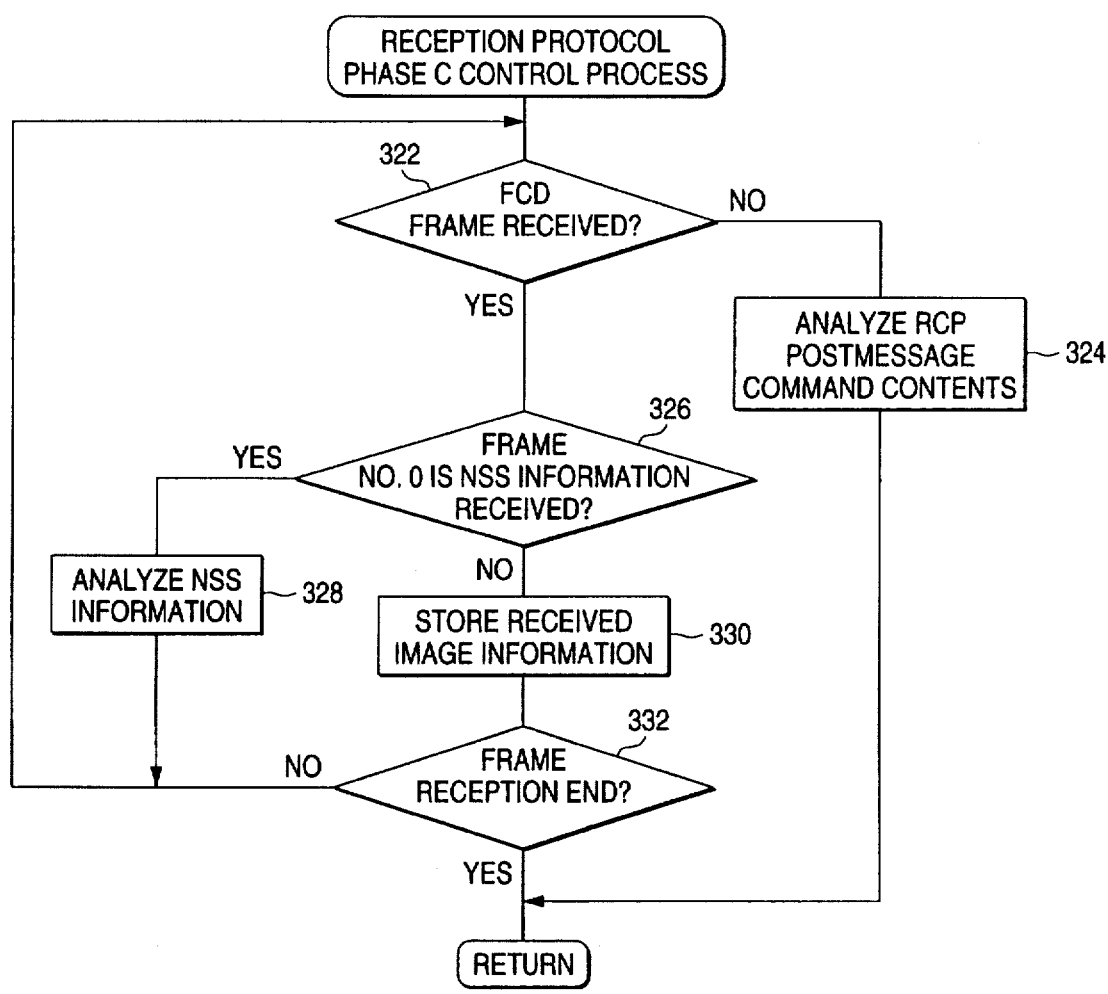
FIG. 9 is a flowchart showing a reception protocol phase C control process.

Next, the reception protocol phase C control process will be discussed with reference to FIG. 9. In the process, image information divided into frames according to ECM and sent is received. In the frame configuration, parameters indicating the subsequently sent image information are set in the first frame (frame No.0) and the image information is set in the second frame and later. At step 322, whether or not an FCD (facsimile coded data) frame has been received is determined. If it is not received, namely, an RCP frame with a postmessage command set in a facsimile information field has been received, the postmessage command contents of the RCP are analyzed at step 324 and the transition is made to phase D for sending a response command.

If the FCD frame has been received, whether or not frame No.0 (first frame) has been received, namely, NSS information has been received is determined at step 326. If it has been received, the NSS information is analyzed at step 328; if not, namely, if frame No.1 or later (second frame or later) has been received, the received image information frame is stored in the image storage unit 24 at step 330, and whether or not the frame reception is to be terminated is determined at step 332. If it is terminated, the transition is made to phase D; if not, the steps are repeated.

Figure 7:
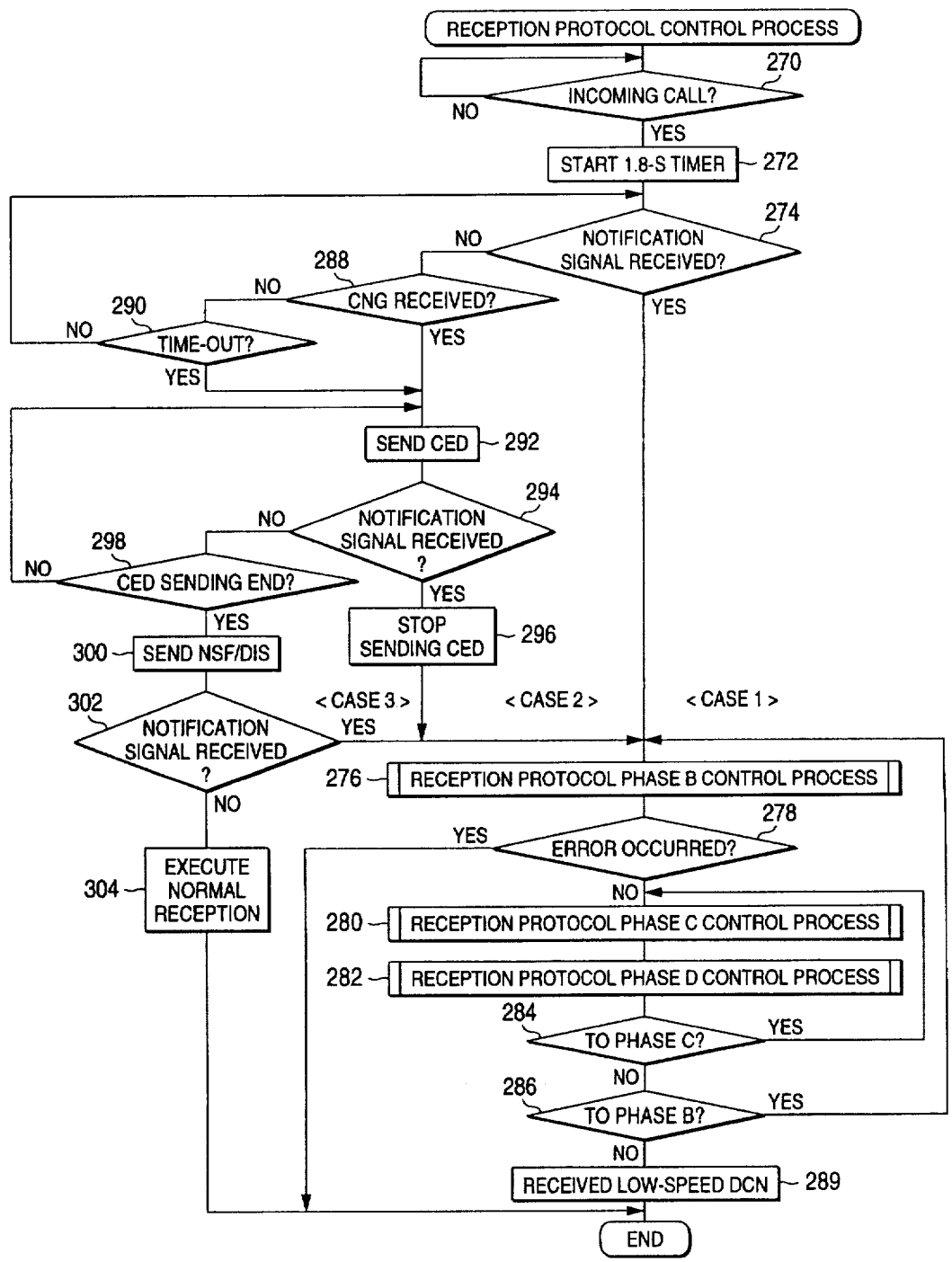
FIG. 7 is a flowchart showing reception protocol control processing.
Figure 10:
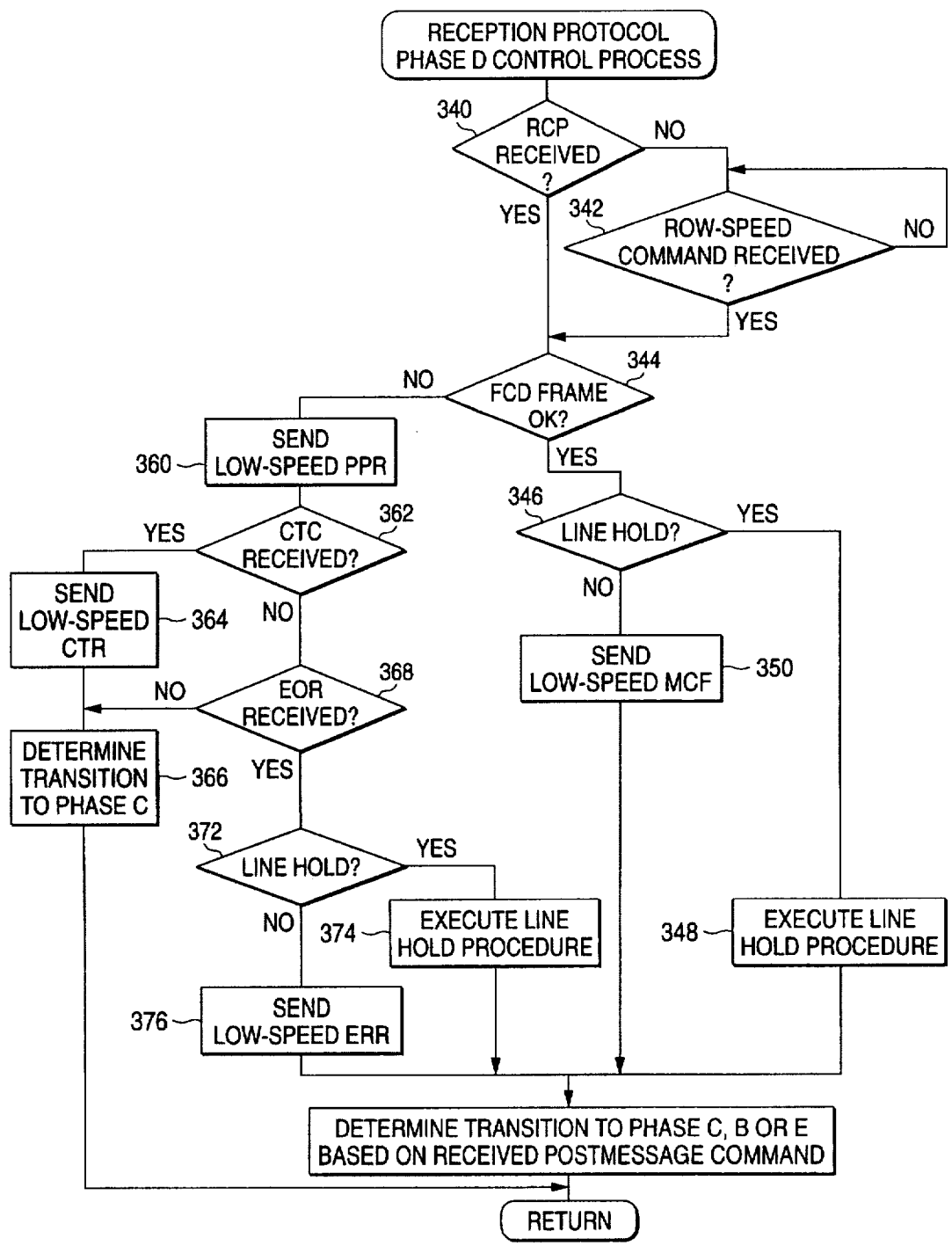
FIG. 10 is a flowchart showing a reception protocol phase D control process.

Next, the reception protocol phase D control process will be discussed with reference to FIG. 10. At step 340, whether or not an RCP frame is received is determined. If it is not received, a wait is made at step 342 until a low-speed command is received. If an RCP frame is received or a low-speed command has been received, the FDC frame reception condition is checked at step 344. If it is good, whether or not the line is held is determined at step 346. If the line is held, a line hold procedure is executed at step 348; if not, a low-speed MCF is sent at step 350, then control advances to step 352. Which of transmission phases C, B, and E the transition is to be made to is determined at step 352 based on the PMC set in the RCP frame, and the determination result is stored. The determinations at steps 284 and 286 in FIG. 7 are made according to the above determination result.

If it is determined at step 344 that the FCD frame reception condition is not good, a low-speed PPR is sent at step 360 and whether or not a CTC has been received is determined at step 362. If it has been received, a CTR is sent at low speed at step 364, then the transition to phase C is determined at step 366 and the determination result is stored. If no CTC is received, whether or not an EOR has been received is determined at step 368. If it is not received, control goes to step 366; if it has been received, whether or not the line is held is determined at step 372. If the line is held, the line hold procedure is executed at step 374; if not, an ERR is sent at low speed at step 376, then control goes to step 352.

Figure 11:
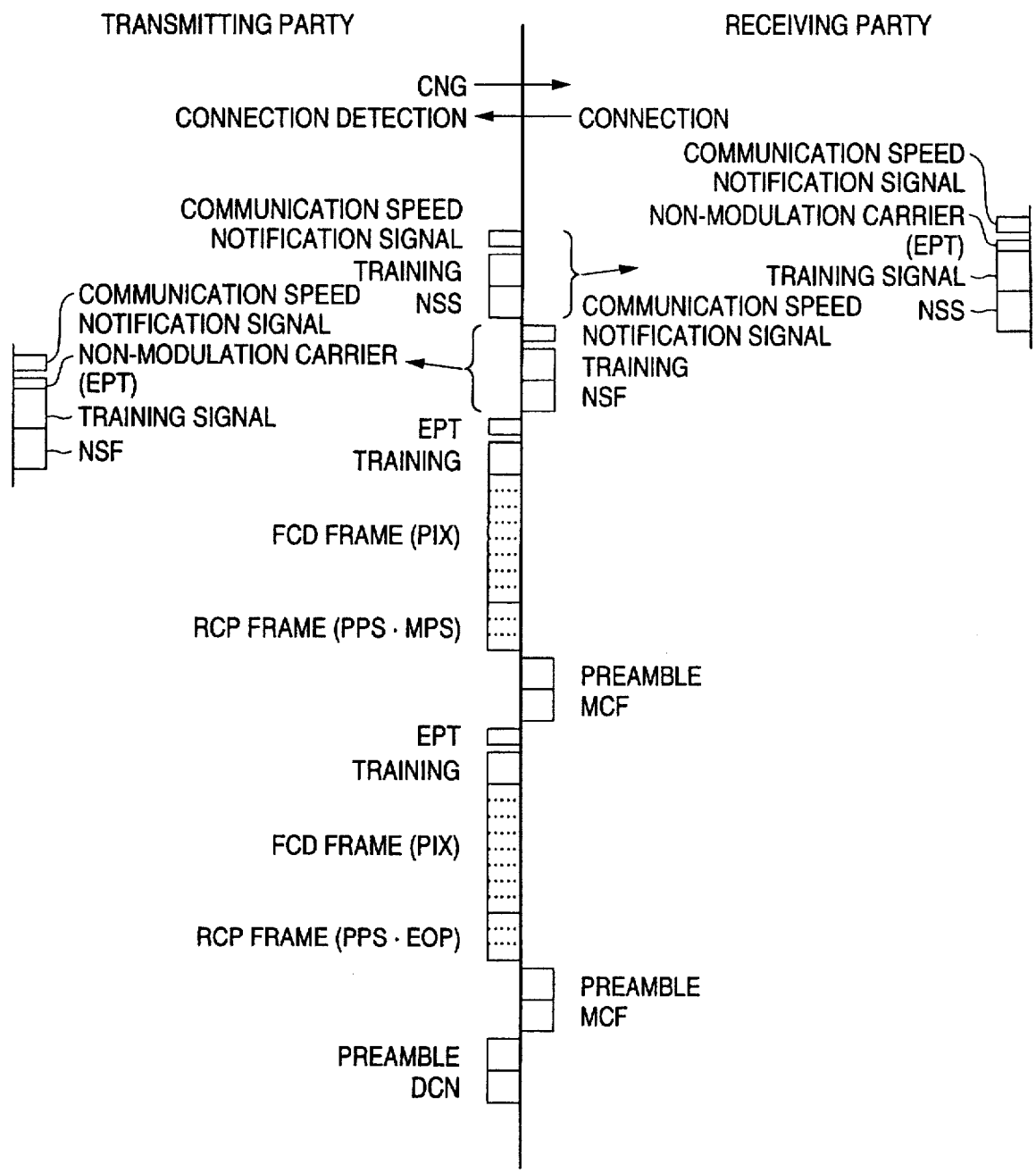
FIG. 11 is a diagram showing a signal sequence of simplified protocol in simplified protocol mode transition case 1 at the transmission and reception time according to the first embodiment of the invention.
Figure 12:
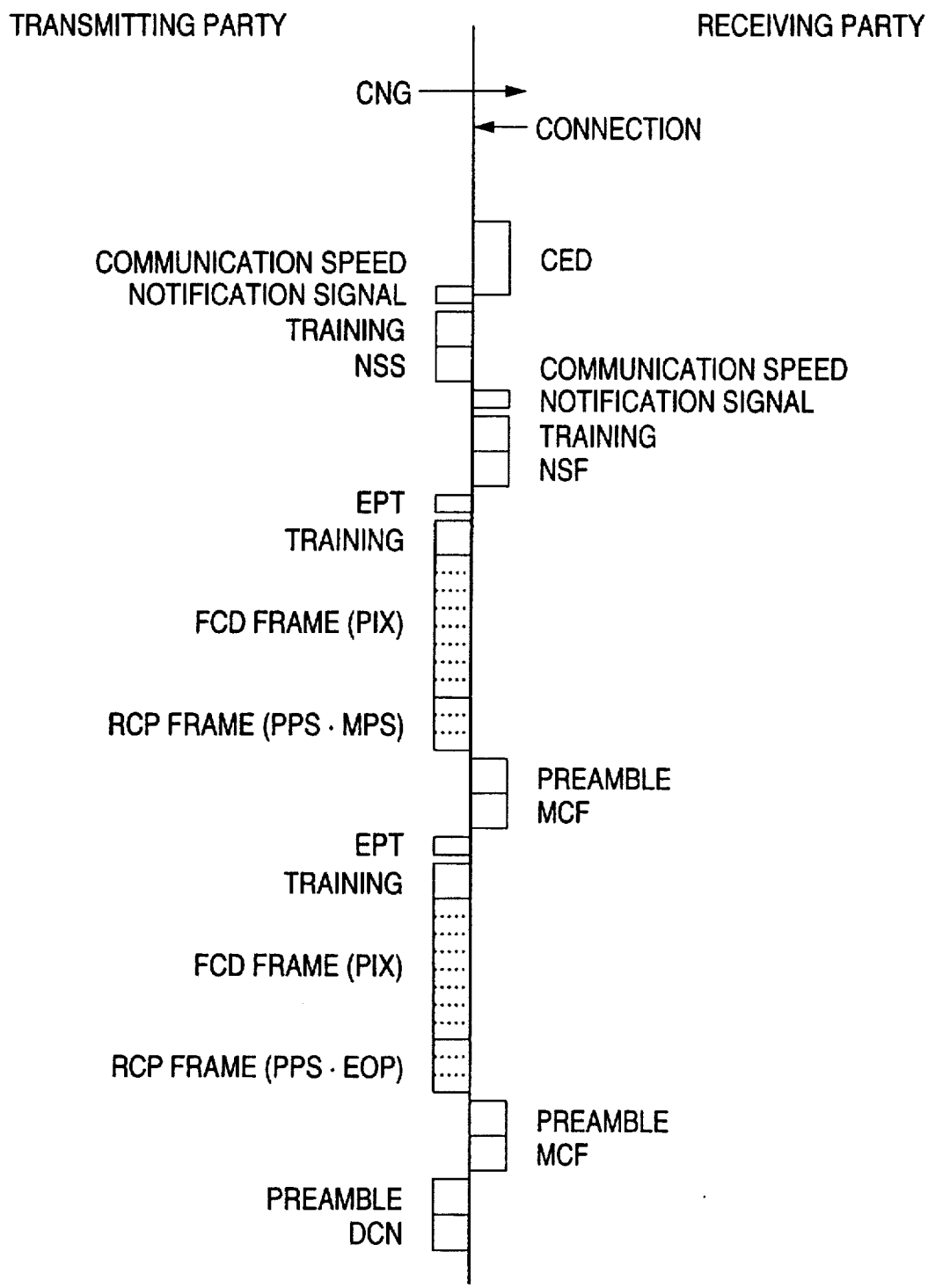
FIG. 12 is a diagram showing a signal sequence of simplified protocol in simplified protocol mode transition case 2 at the transmission and reception time according to the first embodiment of the invention.
Figure 13:
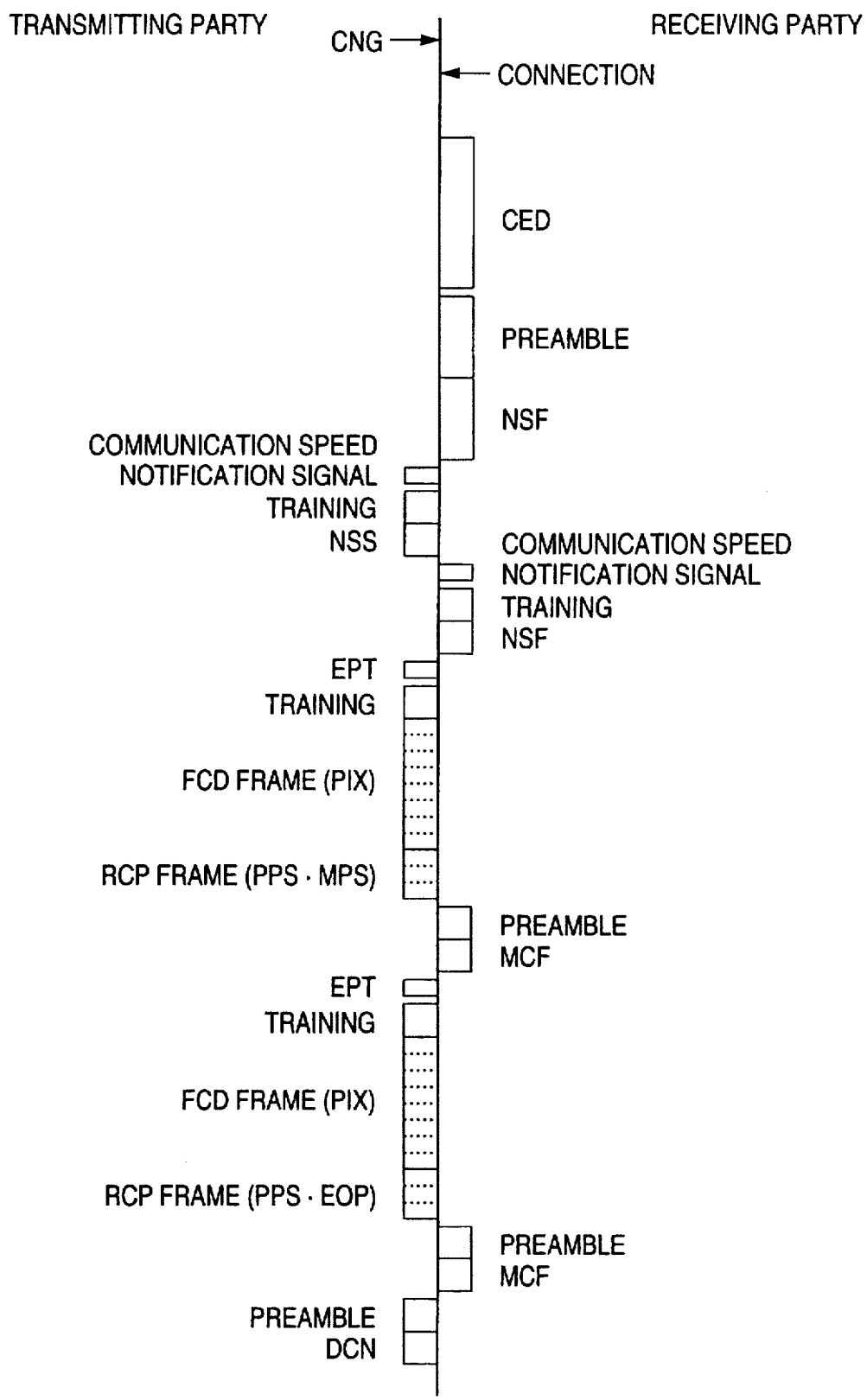
FIG. 13 is a diagram showing a signal sequence of simplified protocol in simplified protocol mode transition case 3 at the transmission and reception time according to the first embodiment of the invention.

FIGS. 11–13 show communication sequences in simplified protocol mode transition cases (1) to (3) at the transmission and reception time in the above-described processing. In the figures, the RCP frame (PPS.MPS) denotes that the postmessage command PPS·MPS is set in the RCP frame; the RCP frame (PPS.EOP) denotes that the postmessage command PPS.EOP is set in the RCP frame; and the FCD frame (PIX) denotes that image information PIX is set in the FCD frame. The communication sequences are the same in the operation after the transition to the simplified protocol mode.

Although we have discussed the embodiment using a single tone as the communication speed notification signal for notifying the command communication speed, the invention is not limited to the single tone and DTMF (dual tone multi-frequency), etc., may be sent. To use the DTMF, for example, the following values can be set in the DTMF in response to the communication speed (( )$_H$ denotes that the value enclosed in the parentheses is a hexadecimal number):

| | |
|---|---|
| 9600 bps: (0A)$_H$ | 7200 bps: (0B)$_H$ |
| 4800 bps: (0C)$_H$ | 2400 bps: (0D)$_H$ |

Second Embodiment

Next, a second embodiment of the invention will be discussed. Since the second embodiment has the same configuration as the first embodiment, parts identical with those previously described in the first embodiment are denoted by the same reference numerals in the second embodiment and will not be discussed again. The operation of the second embodiment will be discussed.

To transmit and receive control signals such as NSS and NSF at nonstandard high speed, a training signal needs to be sent for switching the modem speed before the control signals are sent, as shown in FIGS. 11–13. For example, ITU-T Recommendations V.27ter specifies that the training signal should be sent as shown in FIG. 14(A).

That is, a non-modulation carrier (EPT) with constant frequency 1800 Hz is sent for 185–200 msec (segment 1). Next, after a no-signal period for 20–25 msec (segment 2), the training signal is sent for a predetermined time (segments 3–5). After the training signal is sent, a modulation signal (signal modulated in response to data such as NSS or NSF when NSS, NSF, etc., is sent) is sent. Sending the non-modulation carrier (EPT) is not limited to the V.27ter and is also specified in ITU-T Recommendations V.29 (option), V.17, etc.,; it is also executed in the first embodiment as shown in FIG. 11 (not shown in FIG. 12 or 13).

Figure 14:
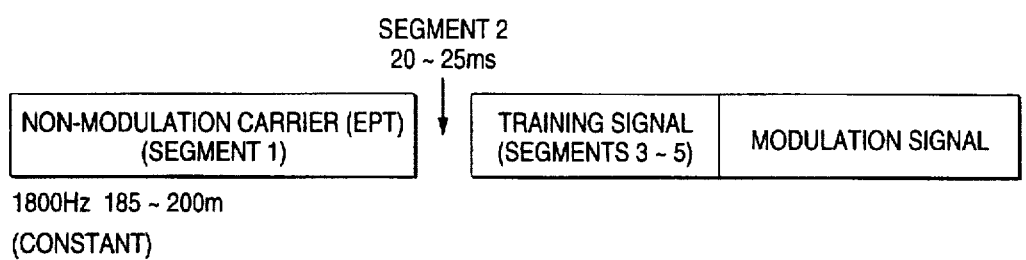
FIG. 14(A) is a conceptual diagram showing the format of a training signal specified in ITU-U Recommendations V.27ter.
FIG. 14(B) is a conceptual diagram showing the format of a training signal according to a second embodiment of the invention.
Figure 14:
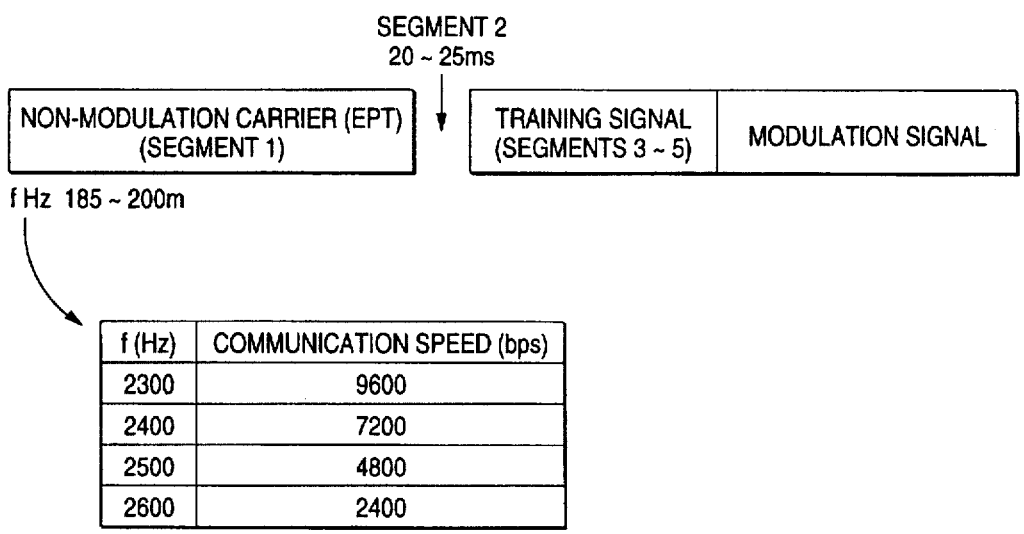

The second embodiment uses the non-modulation carrier to omit sending the communication speed notification signal discussed in the first embodiment and changes the frequency of the non-modulation carrier in response to the communication speed of the control signal of NSS, NSF, etc., shown in FIG. 14(B) as an example for use as the communication speed notification signal. A modem of a facsimile machine in conformity with ITU-T Recommendations V.27ter, V.29 (option), V.17, etc., is provided with a signal generation circuit for generating a non-modulation carrier and a modulation circuit for modulating the non-modulation carrier generated by the signal generation circuit in response to modulated data. The frequency of the non-modulation carrier can be changed simply by outputting a non-modulation carrier frequency change instruction to the signal generation circuit; a new signal generation circuit need not be provided.

Figure 4:
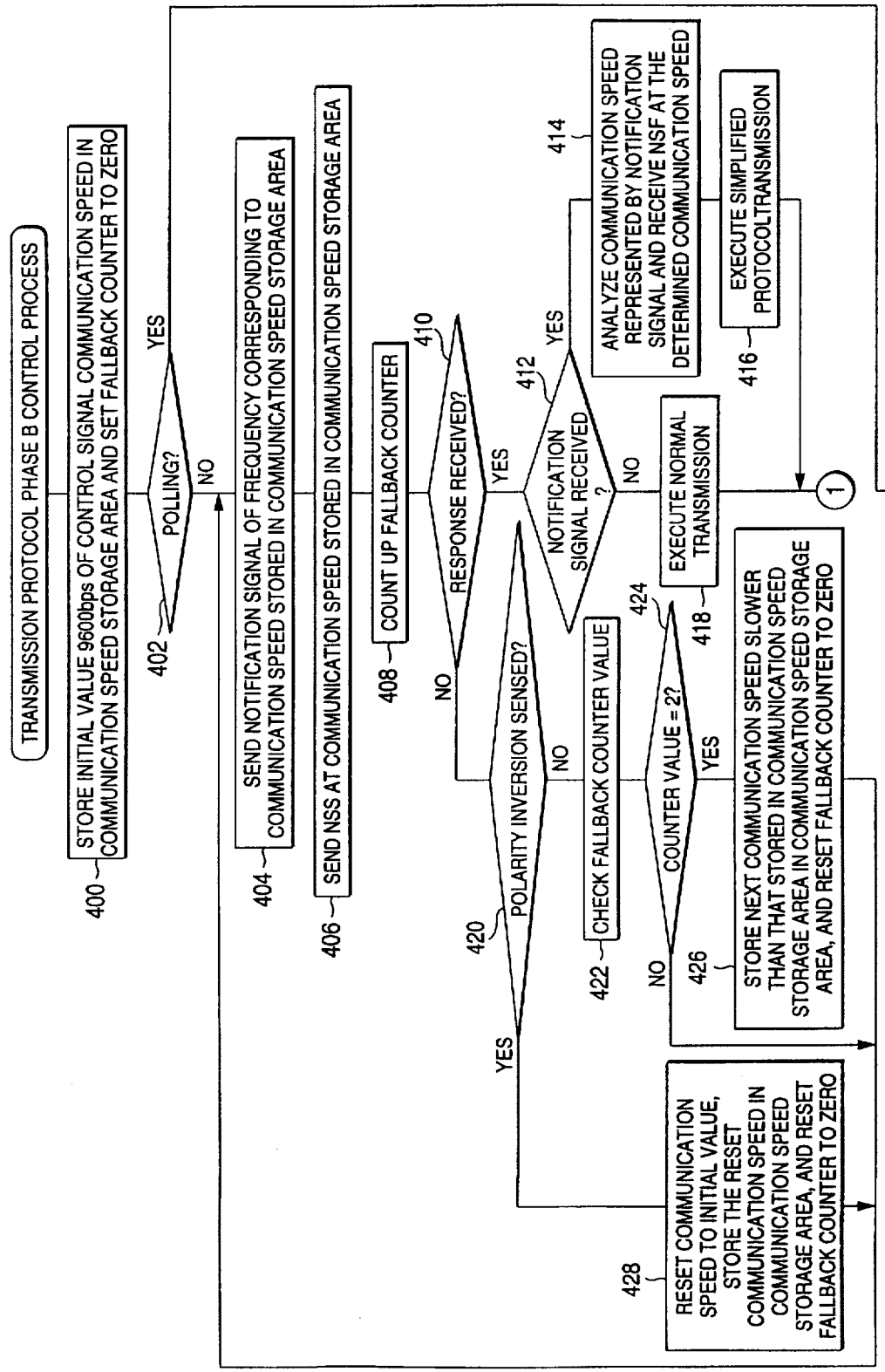
FIGS. 4(A) and 4(B) are a flowchart showing a transmission protocol phase B control process.
Figure 4:
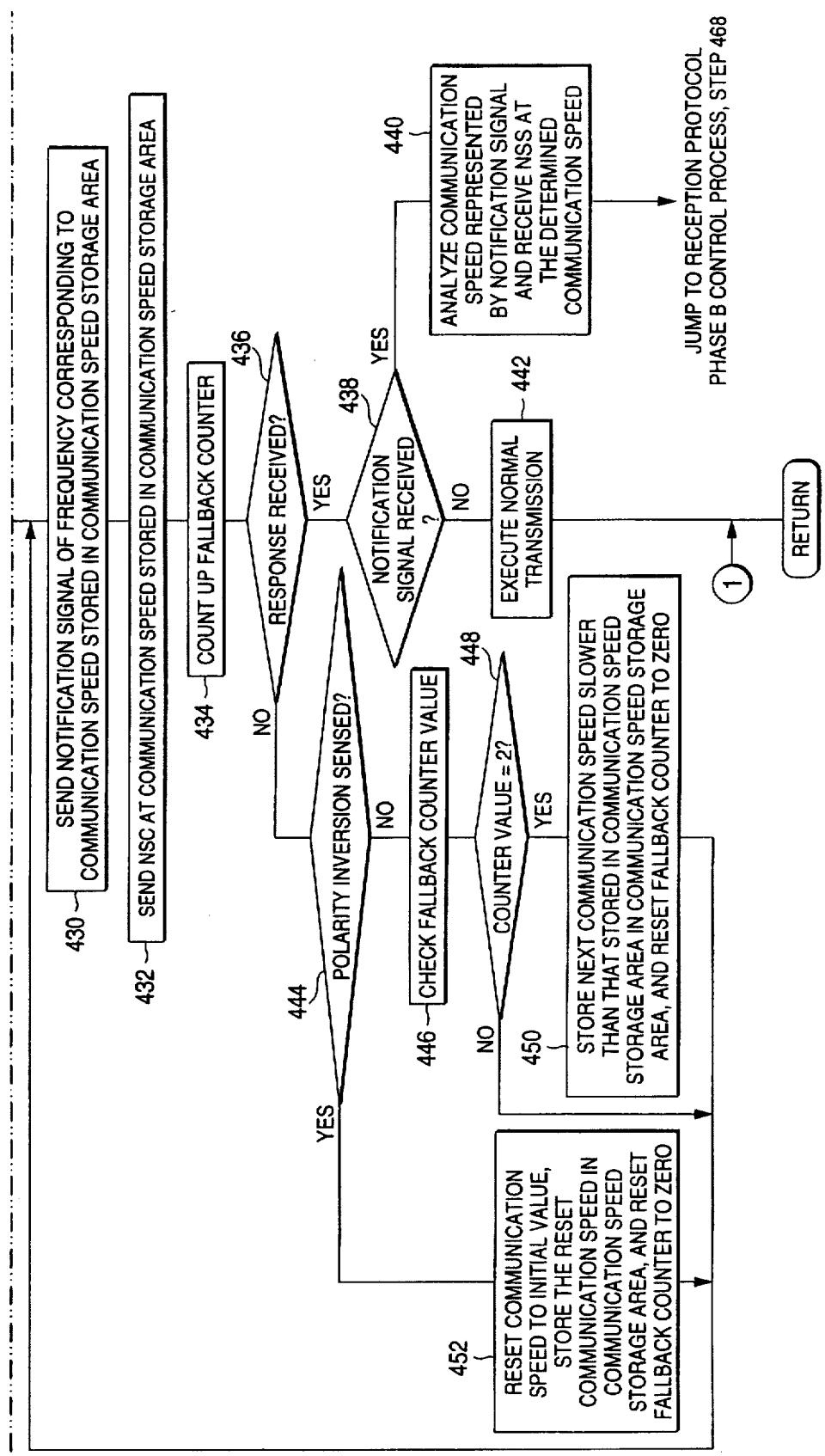
Figure 8:
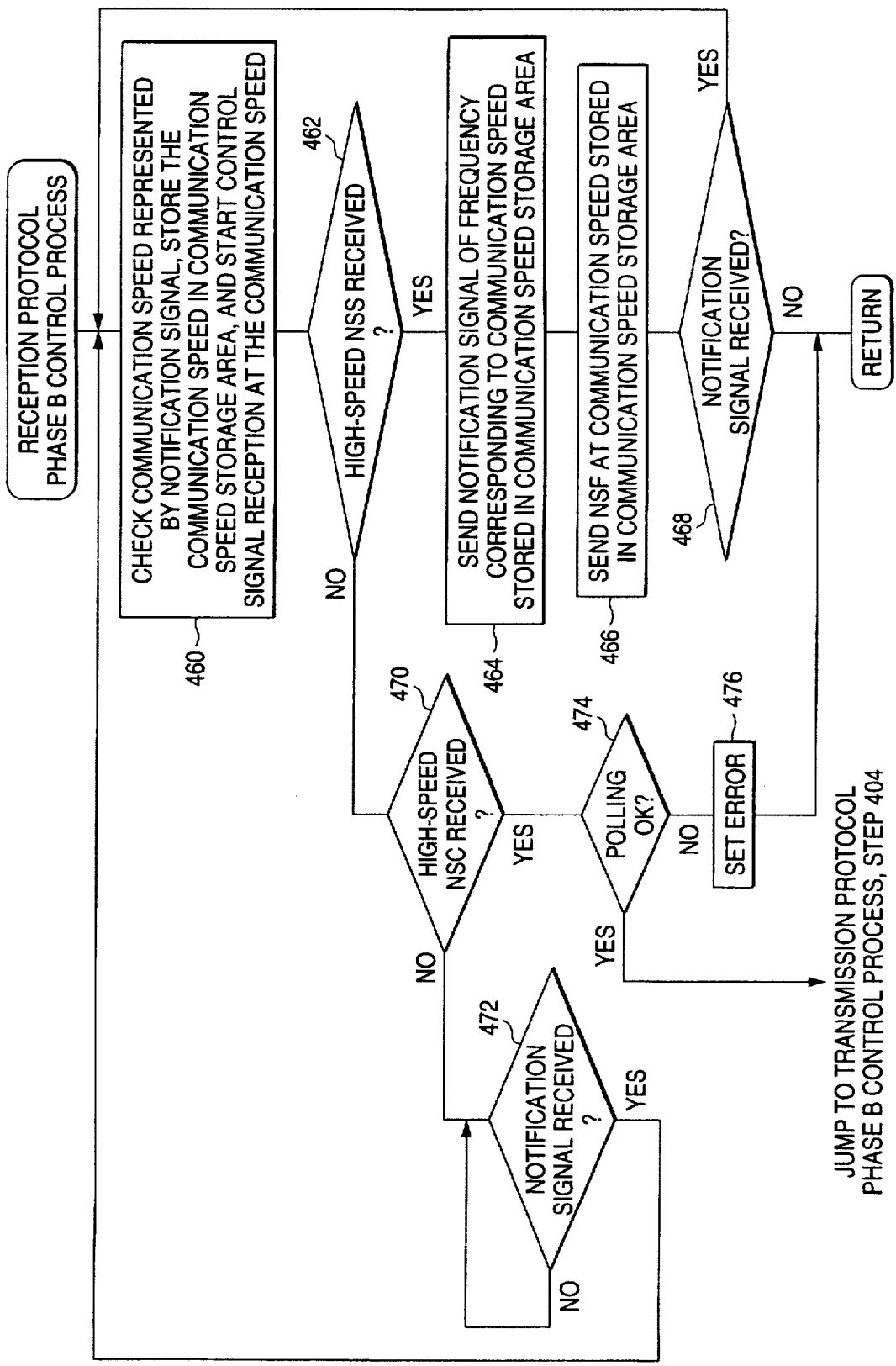
FIG. 8 is a flowchart showing a reception protocol phase B control process.

The instruction to the signal generation circuit may be given instead of sending the communication speed notification signal at step 404, 430 of the transmission protocol phase B control process shown in FIG. 4 and at step 464 of the reception protocol phase B control process shown in FIG. 8. At steps 412 and 414 or 438 and 440 of the transmission protocol phase B control process in FIG. 4, step 274, 294, or 302 of the reception protocol control processing in FIG. 7, and step 460 of the reception protocol phase B control process in FIG. 8, whether or not a non-modulation carrier has been received may be determined and if it is received, the communication speed represented by the received non-modulation carrier may be analyzed, the analyzed communication speed may be stored in the communication speed storage area, and the control signal may be received at the analyzed communication speed.

Figure 15:
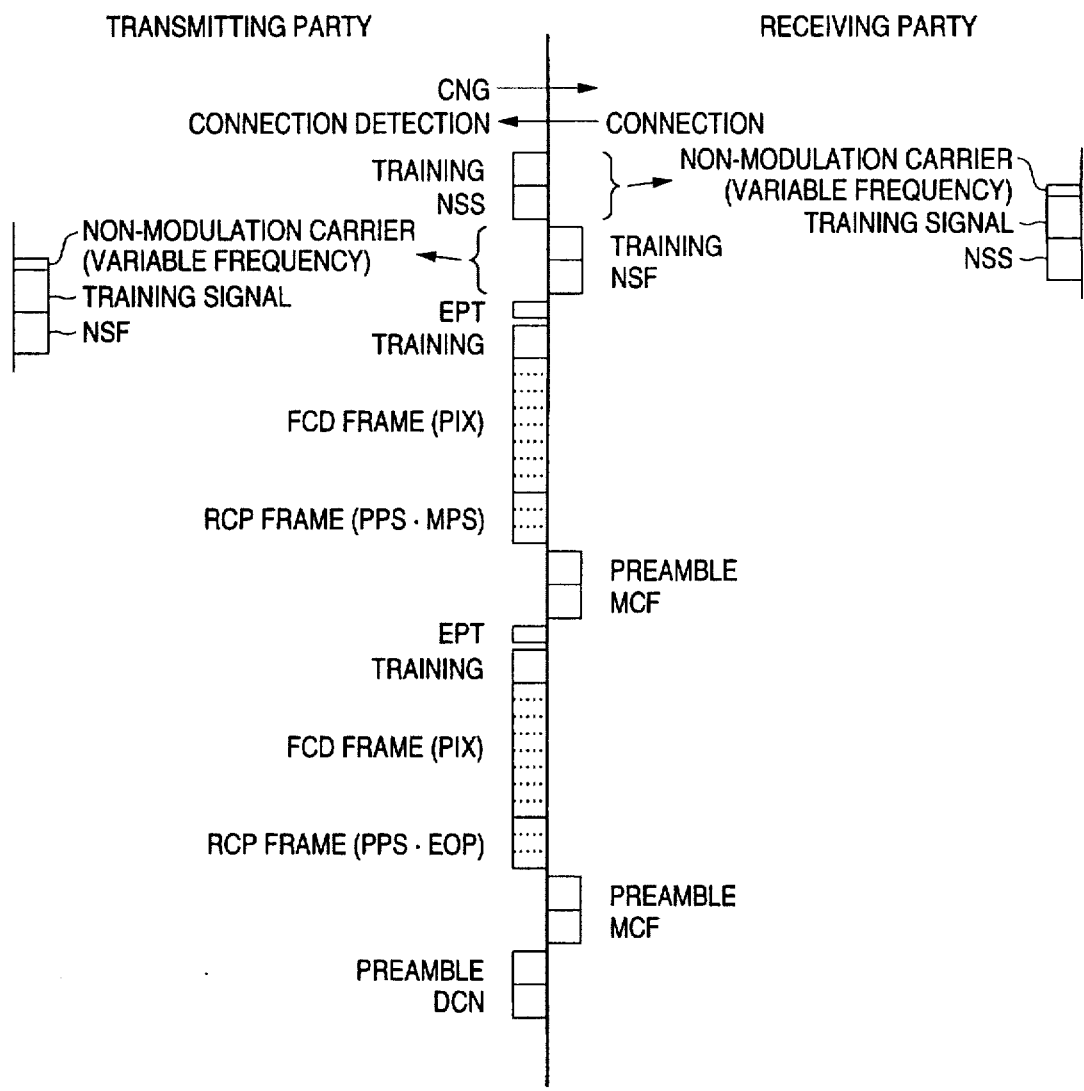
FIG. 15 is a diagram showing a signal sequence of simplified protocol in simplified protocol mode transition case 1 at the transmission and reception time according to the second embodiment of the invention.
Figure 16:
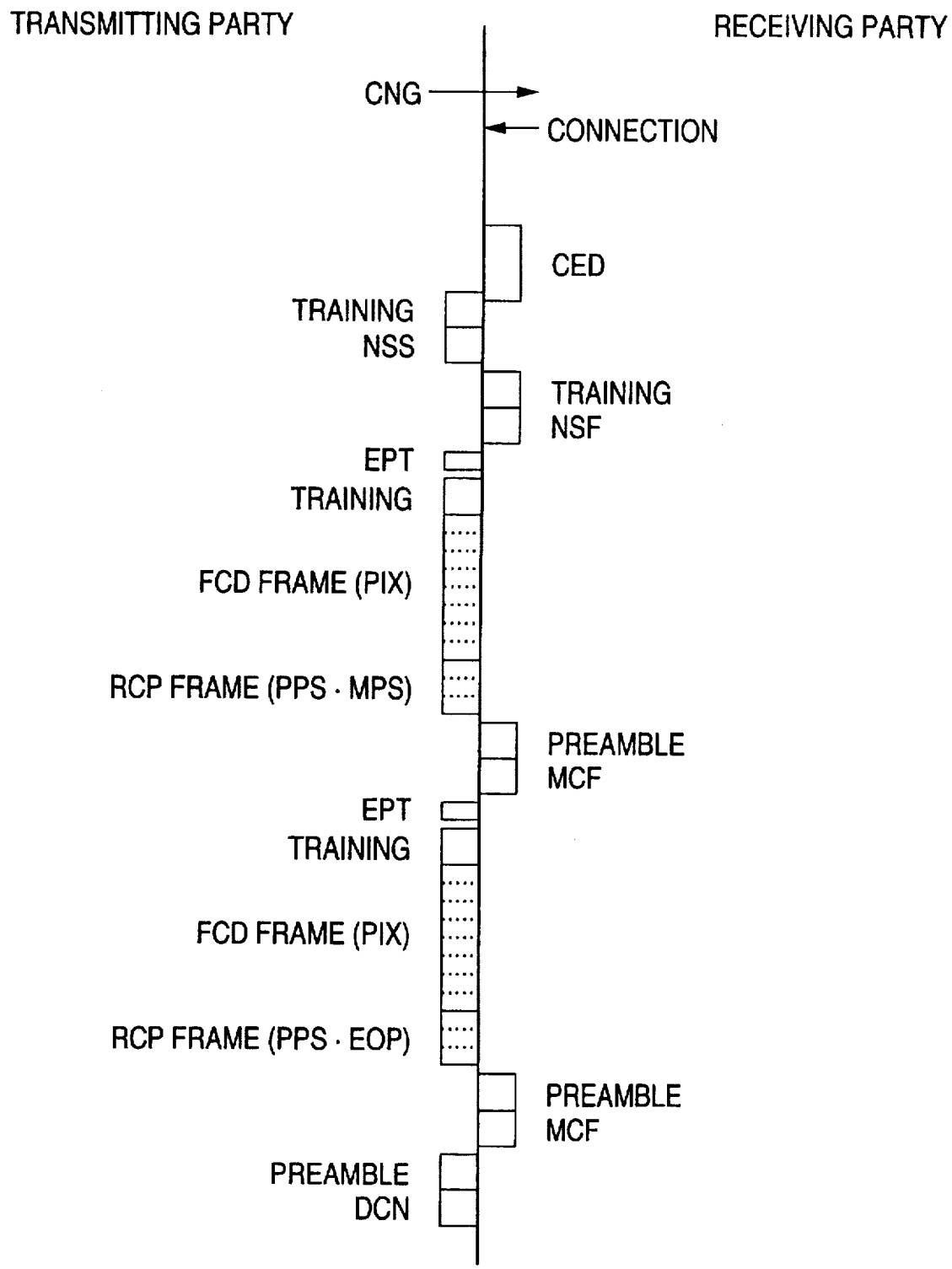
FIG. 16 is a diagram showing a signal sequence of simplified protocol in simplified protocol mode transition case 2 at the transmission and reception time according to the second embodiment of the invention.
Figure 17:
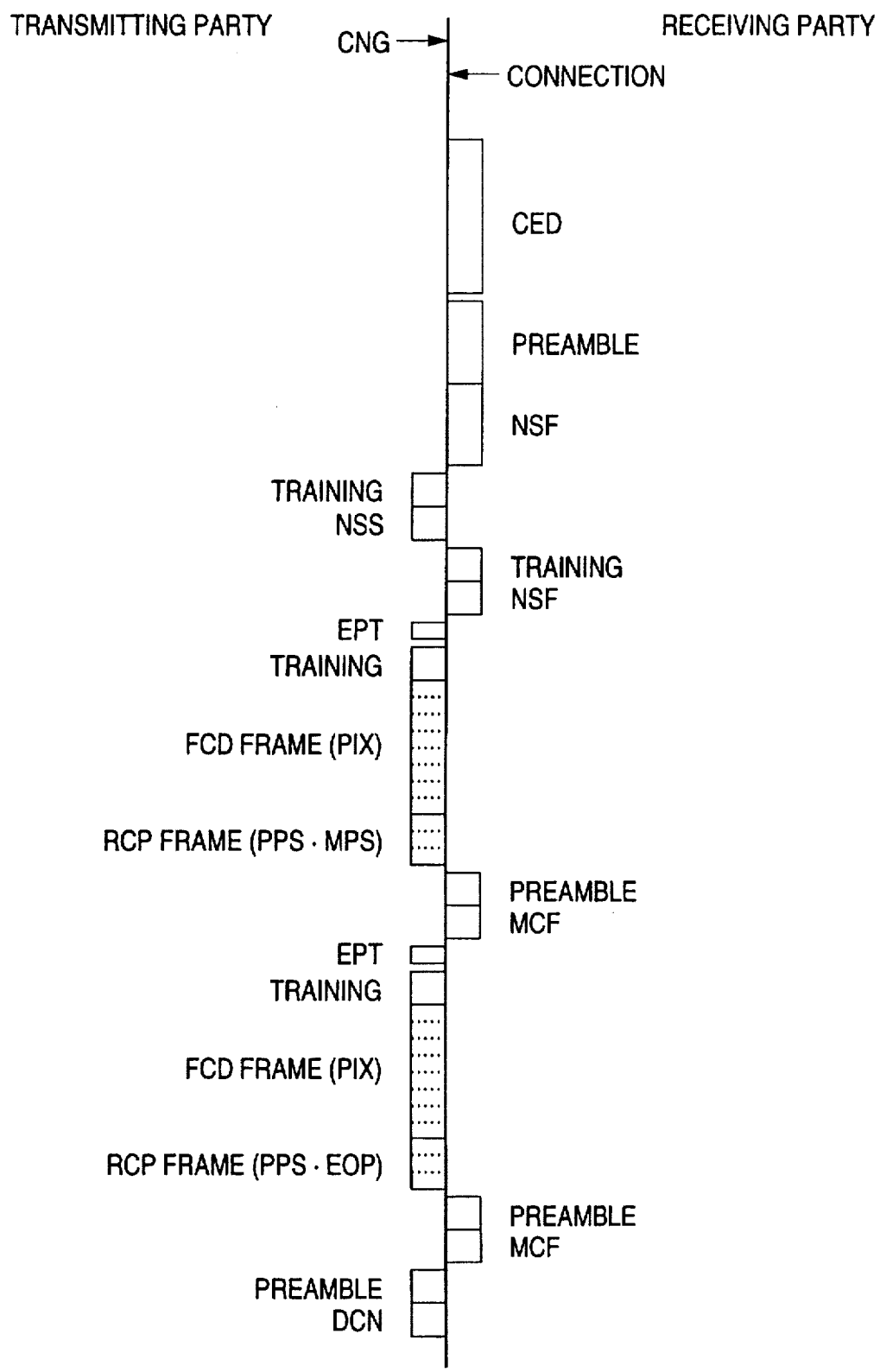
FIG. 17 is a diagram showing a signal sequence of simplified protocol in simplified protocol mode transition case 3 at the transmission and reception time according to the second embodiment of the invention.

The communication sequences are as shown in FIGS. 15–17. Comparing them with FIGS. 11–13 in the first embodiment, it can be understood that the communication speed notification signal in the first embodiment is omitted, shortening the time required for transmitting and receiving the communication speed notification signal, furthermore shortening the time to starting of transmission and reception of image information.

In the embodiment, the information indicating whether or not the associated machine has the simplified protocol function and that indicating whether or not the associated machine has the polarity inversion function are stored in correspondence with each of the associated machines registered in the abbreviated telephone number list. The invention is not limited to it. The information may be stored for all associated machines with which the home facsimile machine communicated in the past. In this case, to lessen the amount of information to be stored, for example, the information may be deleted in order starting at the associated machine having the longest period since the last communication or the associated machine with which the home machine communicated least frequently within a predetermined period, needless to say.

Although we have discussed the embodiments by taking transmission and reception of NSS and NSF before image information as an example, the control signals of the invention are not limited to these commands, needless to say.

Although we have discussed the embodiments of the invention, the embodiments contain the following technical aspects in addition to the technical aspects described in the accompanying claims:

(1) The facsimile machine as claimed, further including means for storing information indicating whether or not the associated machine has a function of transmitting and receiving control signals at nonstandard high communication speed, wherein when the notification signal sending means decides that the associated machine has the above function based on the information stored in the storage means, it sends a communication speed notification signal.

In this facsimile machine, only when the associated machine has the function of transmitting and receiving control signals at nonstandard high communication speed, the facsimile machine sends the communication speed notification signal and sends control signals at the nonstandard high communication speed. As compared with the case where the communication speed notification signal is always sent regardless of what the associated machine is, useless sending of the communication speed notification signal when the associated machine does not have the function can be prevented. Since it is not necessary to store information of NSFs gotten during the past communication as in Japanese Patent Unexamined Publication No. Hei. 3-154566, the amount of information to be stored can be lessened, needless to say.

(2) The facsimile machine as described in (1), further including means for changing the information stored in the storage means if a function of the associated machine differs from the information stored in the storage means.

In this facsimile machine, if the associated machine is changed from the model not having the function of transmitting and receiving control signals at nonstandard high communication speed to a model having the function or vice versa, useless signal sending can also be prevented and the time to starting of image information transfer can be shortened.

(3) The facsimile machine as claimed, wherein the notification signal sending means sends a communication speed notification signal when polarity inversion is sensed or a CED (called equipment identification signal) is received.

In this facsimile machine, if polarity inversion is sensed just after the line is connected, the communication speed notification signal is sent and a control signal can be sent at nonstandard high communication speed, so that the time to start of image information transfer can be minimized. If the associated machine does not have the polarity inversion function or cannot sense polarity inversion, a control signal can also be sent at nonstandard high communication speed from a comparatively early stage.

As discussed above, in the invention, the control signals can be transmitted and received at high speed before image information transfer and the time to starting of the image information transfer can be furthermore shortened.

What is claimed is:

1. A facsimile machine comprising:
   means for determining a communication speed for sending a control signal from a sending station to a receiving station:
   means for sending a communication speed notification signal representing the communication speed determined by said determining means from said sending station to said receiving station, and
   means for sending said control signal from the sending station to the receiving station at the determined communication speed after said communication speed notification signal is sent by said notification signal sending means,
   wherein the communication speed notification signal sent from the sending station to the receiving station is a signal provided by adjusting the frequency of a non-modulation carrier (EPT) defined in ITU-T Recommendations V.27ter, V29 (option), and V.17, to a frequency selected from plural predetermined communication speeds.

2. A facsimile machine comprising:
   means for receiving a communication speed notification signal representing a communication speed of a control signal sent from an associated machine;
   means for analyzing the communication speed represented by the received communication speed notification signal; and
   means for receiving the control signal sent from the associated machine at the communication speed analyzed by said analyzing means,
   wherein the communication speed notification signal sent to the associated machine is a signal provided by adjusting the frequency of a non-modulation carrier (EPT) defined in ITU-T Recommendations V.27ter, V29 (option), and V.17, to a frequency selected from plural predetermined communication speeds.

3. A facsimile machine comprising:
   means for receiving a communication speed notification signal representing a communication speed of a control signal sent from an associated machine;
   means for analyzing the communication speed represented by the received communication speed notification signal; and
   means for receiving the control signal sent from the associated machine at the communication speed analyzed by said analyzing means,
   wherein after the control signal sent from the associated machine is received, a control signal is sent to the associated machine at the communication speed analyzed by said analyzing means and wherein the communication speed notification signal sent to the associated machine is a signal provided by adjusting the frequency of a non-modulation carrier (EPT) defined in ITU-T Recommendations V.27ter, V29 (option), and V.17, to a frequency selected from plural predetermined communication speeds.

4. A facsimile machine comprising:
   means for determining a communication speed of a first control signal to be sent to an associated machine;
   means for sending a communication speed notification signal representing the communication speed determined by said determining means to the associated machine;
   means for sending said first control signal to the associated machine at the determined communication speed after said communication speed notification signal is sent;
   means for receiving from said associated machine an associated machine communication speed notification signal representing the communication speed of a second control signal sent from the associated machine;
   means for analyzing the associated machine communication speed represented by the received associated machine communication speed notification signal;
   means for receiving the second control signal sent from the associated machine at the associated machine communication speed analyzed by said analyzing means;
   control means for causing said control signal sending means to resend said first control signal to the associated machine if the second control signal from the associated machine is not received after transmission of said first control signal;
   means for counting the number of times a first control signal has been sent to an associated machine, wherein if the second control signal is not received after said first control signal has been resent a predetermined number of times, said control means changes the communication speed of said first control signal sent to the associated machine to lower the communication speed thereof and causes said notification signal sending means to send a communication speed notification signal representing the lowered communication speed to the associated machine, then causes said control signal sending means to send said first control signal to the associated machine at the lowered communication speed; and
   means for sensing line polarity inversion, and means responsive to the sensing of line polarity inversion, after said control means has lowered the communication speed of said first control signal, for causing said control means to restore the control signal communication speed to an initial value and causing said notification signal sending means to send a communication speed notification signal representing the communication speed restored to the initial value to the associated machine, followed by said control signal sending means sending said first control signal to the associated machine at the communication speed restored to said initial value, wherein the communication speed notification signal sent to the associated machine is a signal provided by adjusting the frequency of a non-modulation carrier (EPT) defined in ITU-T Recommendations V.27ter, V29 (option), and V.17, to a frequency selected from plural predetermined communication speeds.

* * * * *